(12) United States Patent
Chen et al.

(10) Patent No.: US 9,949,033 B2
(45) Date of Patent: Apr. 17, 2018

(54) PLANAR SENSOR ARRAY

(71) Applicant: THE AUSTRALIAN NATIONAL UNIVERSITY, Acton, ACT (AU)

(72) Inventors: Hanchi Chen, Braddon (AU); Pallage Thushara Abhayapala, Bruce (AU); Wen Zhang, Forde (AU)

(73) Assignee: The Australian National University, Acton, Australian Capital Territory (AU)

( * ) Notice: Subject to any disclaimer, the term of this patent is extended or adjusted under 35 U.S.C. 154(b) by 0 days.

(21) Appl. No.: 15/328,369

(22) PCT Filed: Jul. 16, 2015

(86) PCT No.: PCT/AU2015/000413
§ 371 (c)(1),
(2) Date: Jan. 23, 2017

(87) PCT Pub. No.: WO2016/011479
PCT Pub. Date: Jan. 28, 2016

(65) Prior Publication Data
US 2017/0180861 A1    Jun. 22, 2017

(30) Foreign Application Priority Data
Jul. 23, 2014    (AU) ................................ 2014902837

(51) Int. Cl.
*H04R 5/027*    (2006.01)
*H04S 3/00*    (2006.01)

(52) U.S. Cl.
CPC ............. *H04R 5/027* (2013.01); *H04S 3/002* (2013.01); *H04R 2201/401* (2013.01); *H04S 2400/15* (2013.01); *H04S 2420/11* (2013.01)

(58) Field of Classification Search
CPC ...... H04R 3/00; H04R 3/005; H04R 2430/21; H04R 5/027; H04R 29/005; H04R 2201/401; H04R 1/406; H04S 2400/15
(Continued)

(56) References Cited

U.S. PATENT DOCUMENTS

| 2010/0054082 | A1 | 3/2010 | McGarry et al. |
| 2012/0093344 | A1* | 4/2012 | Sun ........................ H04R 3/005 381/122 |
| 2014/0177867 | A1* | 6/2014 | Christoph .............. H04R 3/005 381/92 |

FOREIGN PATENT DOCUMENTS

| CN | 103592628 A | 2/2014 |
| WO | 0158209 A1 | 8/2001 |
| WO | 201306828 A1 | 5/2013 |

* cited by examiner

*Primary Examiner* — Melur Ramakrishnaiah
(74) *Attorney, Agent, or Firm* — Coats & Bennett, PLLC

(57) ABSTRACT

A method (500) for constructing a three-dimensional (3D) wave field representation of a 3D wave field using a two-dimensional (2D) sensor array (110), said method comprising: acquiring 3D wave field signals using a 2D array (110) of sensors (340, 350), said 2D array (110) of sensors (340, 350) comprising omnidirectional sensors (340) and first order sensors (350) arranged in a 2D plane; digitizing said acquired 3D wave field signals; computing even coefficients of spherical harmonics dependent upon said digitized 3D wave field signals acquired by said omnidirectional sensors (340); computing odd coefficients of said spherical harmonics dependent upon said digitized 3D wave field signals acquired by said first order sensors (350); and constructing a 3D wave field representation dependent upon said computed even and odd coefficients for said acquired 3D wave field signals.

21 Claims, 14 Drawing Sheets

(58) Field of Classification Search
USPC .............................. 381/25–25, 122; 367/138
See application file for complete search history.

PLANAR SENSOR ARRAY

TECHNICAL FIELD

The present invention relates generally to the field of signal processing and, in particular, to acquiring three-dimensional (3D) wave field signals using a two-dimensional (2D) sensor array and constructing a 3D wave field representation of the acquired, actual 3D wave field signals.

BACKGROUND

In the field of signal processing, it is desirable to obtain a 3D wave field mathematical representation of the actual 3D wave field signals as such a representation enables an accurate analysis of the 3D wave field. One such mathematical representation is the 3D wave field spherical harmonic decomposition.

3D wave field signals in a spherical coordinate system (r, θ, φ) can be mathematically represented by equation 1 as an infinite sum of spherical harmonics:

$$P(r, \theta, \phi, k) = \sum_{n=0}^{\infty} \sum_{m=-n}^{n} C_{nm} j_n(kr) \mathcal{P}_{n|m|}(\cos\theta) E_m(\phi) \quad \text{(eq. 1)}$$

where $C_{nm}$ is the coefficient, $j_N(kr)$ is the spherical Bessel function, $Y_{nm} = P_{n|m|}(\cos\theta)E_m(\phi)$ is a representation of the spherical harmonics, $$\mathcal{P}_{n|m|}(\cos\theta) = \sqrt{\frac{(2n+1)}{4\pi}\frac{(n-m)!}{(n+m)!}} P_{n|m|}(\cos\theta) \quad \text{(eq. 2)}$$

is the normalized Associated Legendre function, and $E_m(\phi) = (1/\sqrt{2\pi})e^{jm\phi}$ is the normalized exponential function. The normalized exponential function represents spherical waves in the φ direction, while the normalized Associated Legendre function represents spherical waves in the θ direction.

The spherical harmonics are orthonormal, therefore satisfying:

$$\int_{S^2} Y_{n'm'}(\Omega) Y^*_{nm}(\Omega) d(\Omega) = \tau_{n-n'} \tau_{m-m'} \quad \text{(eq. 3)}$$

where $Y_{nm} = \mathcal{P}_{n|m|}(\cos\theta)E_m(\phi)$ is a representation of the spherical harmonics.

FIG. 10 shows a plot of the spherical harmonics of order 0 to 3, which shows that the odd-modes 1010 of the spherical harmonics are zero at $$\theta = \frac{\pi}{2},$$

and that the even-modes 1020 of the spherical harmonics are non-zero at $$\theta = \frac{\pi}{2}.$$

FIG. 10 also shows the spherical coordinate system corresponding to the spherical harmonics. The even-modes 1020 are only partially marked in FIG. 10 to avoid cluttering the figure. According to the spherical harmonics, only even-modes 1020 are observable on the x-y plane (i.e., $$\theta = \frac{\pi}{2}$$

plane). That is, odd modes 1010 are undetectable on the x-y plane. Therefore, sensors need to be placed at different vertical altitudes to acquire the 3D wave field signals in order to fully produce the mathematical representation of the 3D wave field spherical harmonics decomposition.

One type of array configuration fulfilling the above requirement is the spherical array. The geometry of the spherical array coincides with the spherical harmonics, which makes the 3D wave field signals acquired by the spherical array suitable for generating 3D wave field spherical harmonics decomposition. There are two models of the spherical array configuration: the open sphere model (where the sensors are placed in open space) and the rigid sphere model (where the sensors are placed on the surface of a rigid sphere).

A problem however exists with the spherical array in that the array could be ill-conditioned numerically, due to nulls in the spherical Bessel Functions. This problem results in the acquired 3D wave signals being highly sensitive to the diameter of the spherical array. In addition, placement of sensors on the spherical array follows a strict rule of orthogonality of the spherical harmonics, which limits the flexibility of the array configuration (especially in terms of sensor quantity). Further, the spherical shape of the array poses difficulties in regard to implementation as well as being impractical.

Another limitation of the spherical array is the narrow frequency band, due to the nature of the spherical Bessel function. The spherical array is therefore unable to process 3D wave field signals for certain orders of the spherical harmonics. Design of the spherical array must be performed carefully so that the active spherical Bessel functions are non-zero at the spherical array's radius, for the target frequency band.

Thus, a need exists to provide more practical array configurations.

SUMMARY

Disclosed are arrangements which seek to address the above problems by using a 2D sensor array to acquire the 3D wave field signals and construct the 3D wave field representation from the acquired 3D wave field signals.

According to a first aspect of the present disclosure, there is provided a method for constructing a three-dimensional (3D) wave field representation of a 3D wave field using a two-dimensional (2D) sensor array, said method comprising: acquiring 3D wave field signals using a 2D array of sensors, said 2D array of sensors comprising omnidirectional sensors and first order sensors arranged in a 2D plane; digitizing said acquired 3D wave field signals; computing even coefficients of spherical harmonics dependent upon said digitized 3D wave field signals acquired by said omnidirectional sensors; computing odd coefficients of said spherical harmonics dependent upon said digitized 3D wave field signals acquired by said first order sensors; and constructing a 3D wave field representation dependent upon said computed even and odd coefficients for said acquired 3D wave field signals.

According to another aspect of the present disclosure, there is provided a computer program product including a computer readable medium having recorded thereon a computer program for implementing the method described above.

Other aspects of the invention are also disclosed.

BRIEF DESCRIPTION OF THE DRAWINGS

At least one embodiment of the present invention will now be described with reference to the drawings, in which.

DETAILED DESCRIPTION

Figure 1:
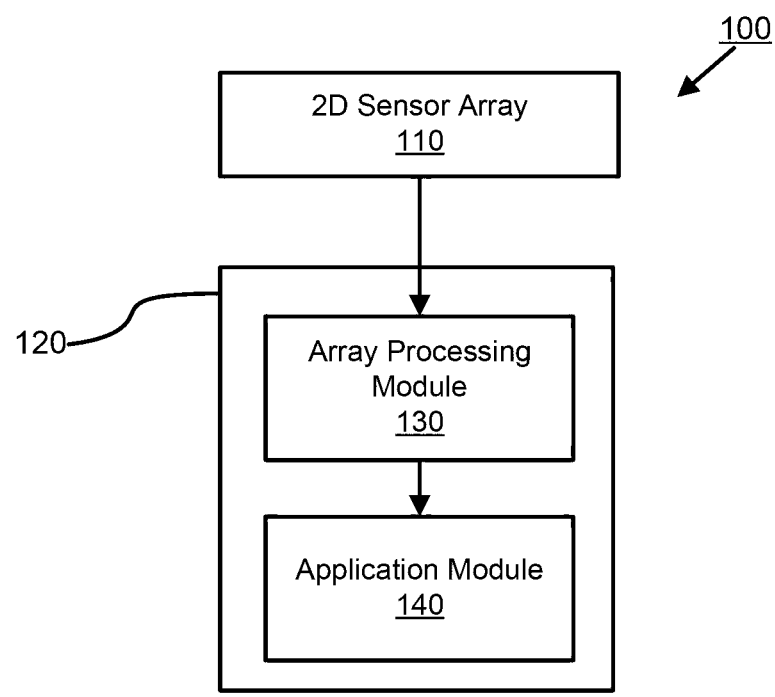
FIG. 1 shows a block diagram of a system using a two-dimensional (2D) array to acquire three-dimensional (3D) wave field signals and construct the 3D wave field representation according to the present disclosure.

Where reference is made in any one or more of the accompanying drawings to steps and/or features, which have the same reference numerals, those steps and/or features have for the purposes of this description the same function(s) or operation(s), unless the contrary intention appears.

Disclosed is an arrangement of a 2D sensor array having omnidirectional and first order (i.e., directional) sensors to acquire 3D wave field signals so that a mathematical representation of the acquired 3D wave field signals can be constructed. The omnidirectional sensors function to acquire the even-modes (i.e., the horizontal wave field) components, whilst the first order sensors measure the odd-modes (i.e., the vertical wave field) components. The 3D wave field representation can then be constructed from the acquired even- and odd-modes components.

FIG. 1 shows a system 100 for acquiring 3D wave field signals and constructing a 3D wave field representation of the acquired 3D wave field signals. The system 100 includes a 2D sensor array 110 and a computer system 120. The sensor array 110 is arranged in a plurality of concentric circular arrays, where each concentric circular array has a radius (different to the other concentric circular arrays) and a discrete number of sensors. The term "sensors" is used hereinafter for consistency, but the terms "antennas", "microphones", and "hydrophones" are equally applicable depending on the circumstances. According to the type of sensor used, the acquired 3D wave field signals may be any one of acoustic wave field signals, radio frequency wave field signals, and microwave wave field signals. The arrangement of the 2D sensor array 110 will be described in detail in relation to FIGS. 3 to 5 below.

The computer system 120 has an array processing module 130 and an application module 140. The array processing module 130 processes 3D wave field signals acquired by the 2D sensor array 110 and generates 3D wave field spherical harmonics decompositions (i.e., even- and odd-modes coefficients) from the acquired 3D wave field signals. The application module 140 uses the generated 3D wave field decompositions in any one of these applications: active noise cancellation, beamforming, direction of arrival estimation, and 3D sound field recording/reproduction.

The computer system 120 can be a general purpose computer system or a special purpose computer dedicated to execute the code of the array processing module 130 and the application module 140. The method for acquiring the 3D wave field signals and generating the 3D wave field spherical harmonics decomposition by the array processing module 130 will be discussed hereinafter in relation to FIG. 5. The implementations of the application module 140 in using the 3D wave field decomposition generated by the array processing module 130 will be described hereinafter in relation to FIGS. 6 to 9.

Computer Description

Figure 2A:
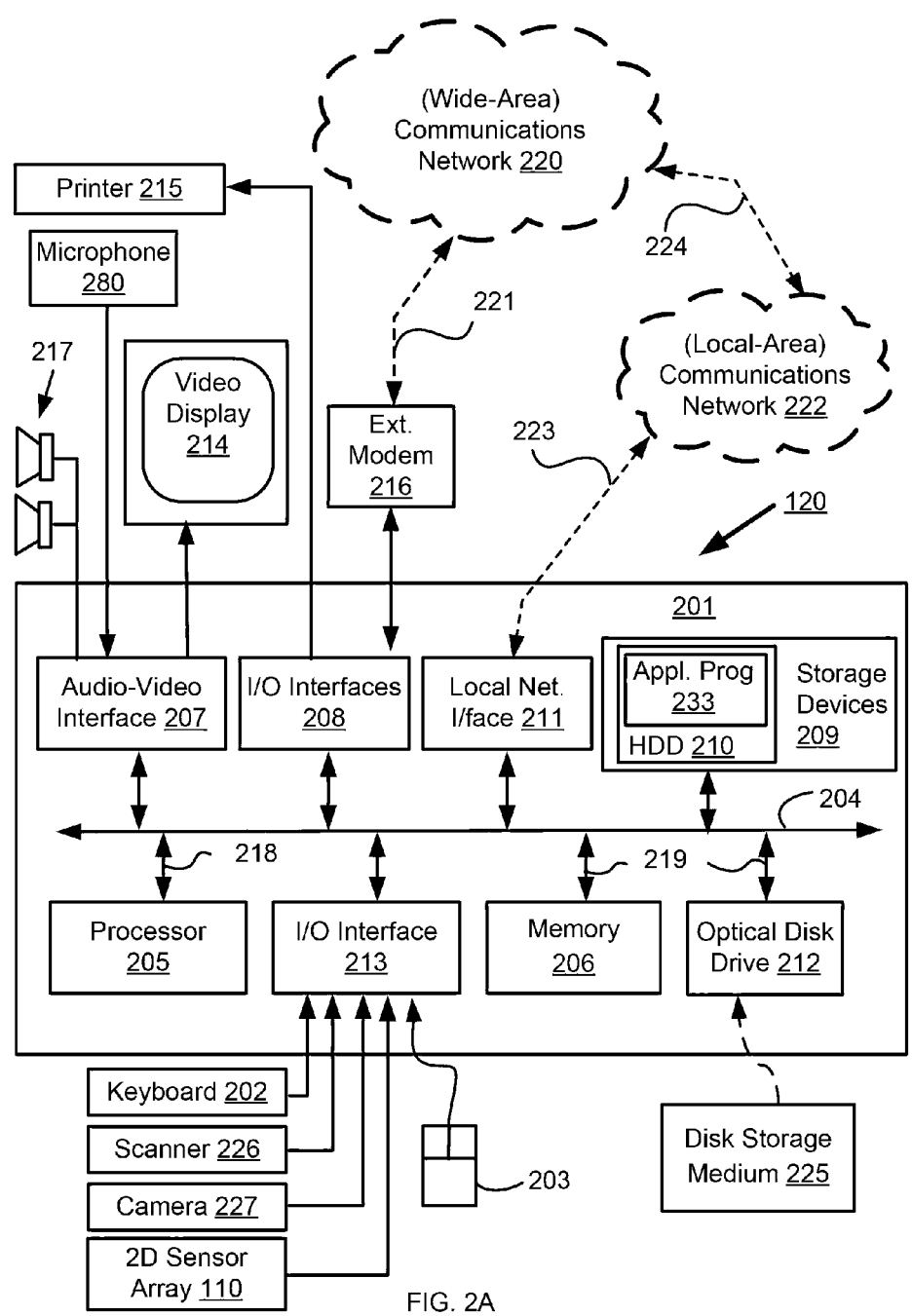
FIGS. 2A and 2B form a schematic block diagram of a general purpose computer system upon which arrangements described can be practiced.
Figure 2B:
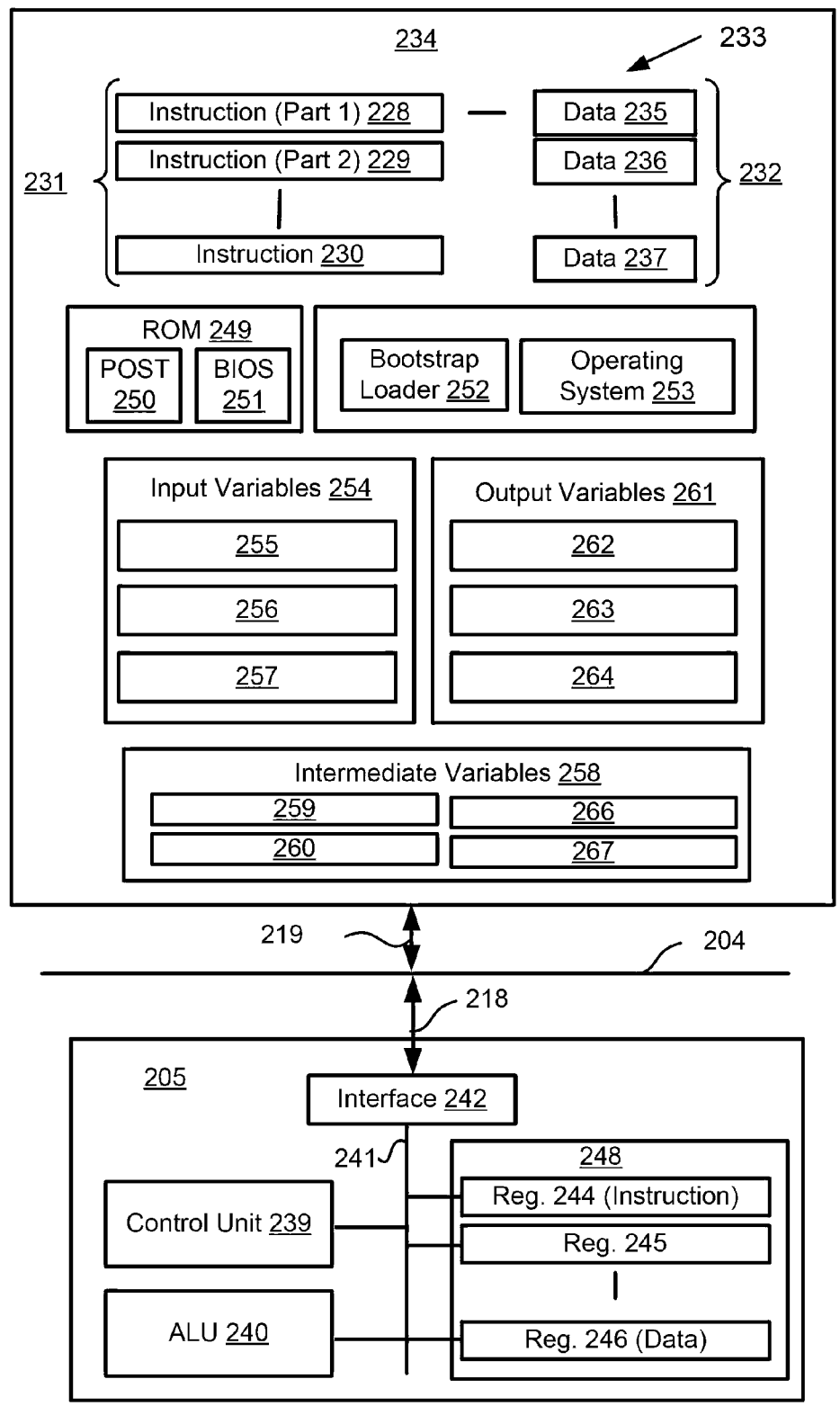

FIGS. 2A and 2B depict a general-purpose computer system 120, upon which the various arrangements described can be practiced.

As seen in FIG. 2A, the computer system 120 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227, the 2D sensor array 110, and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 120 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 120.

The components 205 to 213 of the computer module 201 typically communicate via an interconnected bus 204 and in a manner that results in a conventional mode of operation of the computer system 120 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

Figure 5:
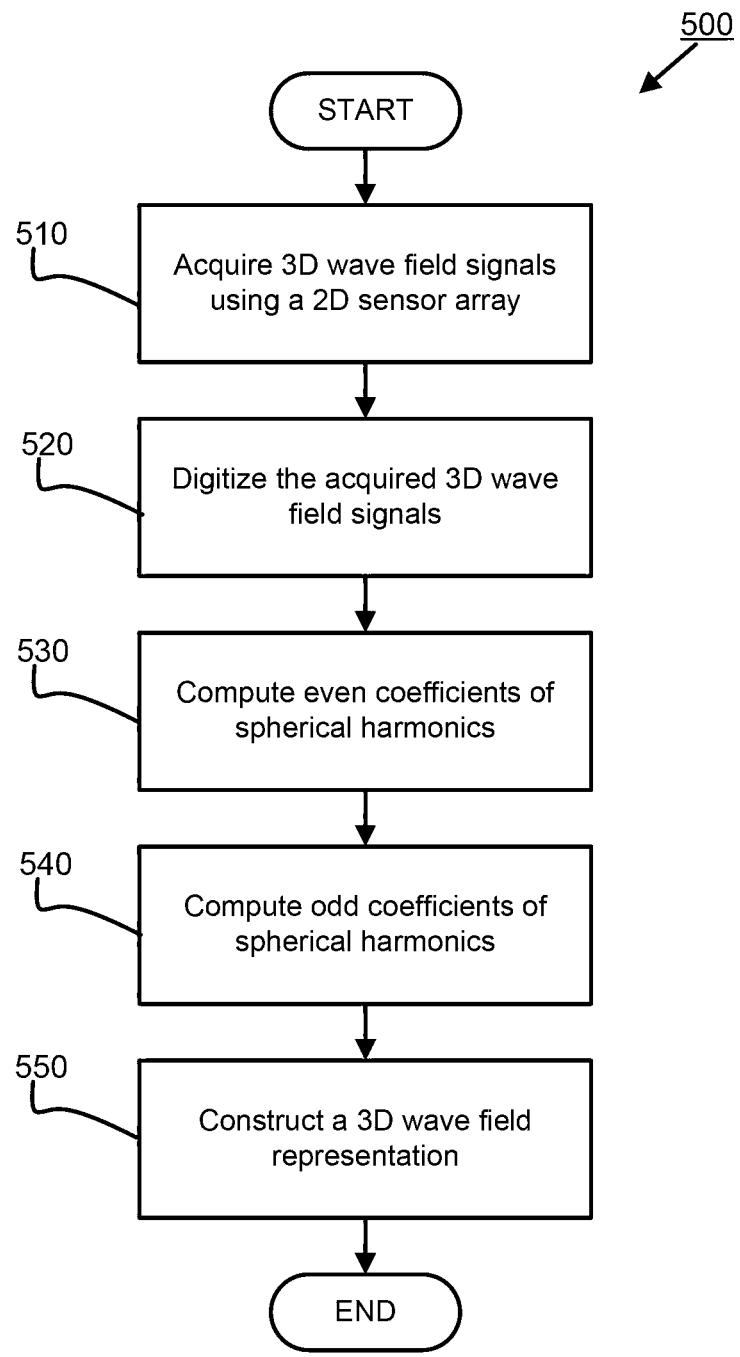
FIG. 5 is a flow diagram of a method for constructing a three-dimensional (3D) wave field representation of a 3D wave field using a two-dimensional (2D) sensor array of FIG. 1.

The method of processing acquired 3D wave field signals to generate 3D wave field decomposition of the spherical harmonics may be implemented using the computer system 120 wherein the processes of FIG. 5, to be described, may be implemented as one or more software application programs 233 executable within the computer system 120. In particular, the steps of the method of generating 3D wave field composition of the spherical harmonics from the 2D sensor array 110 are effected by instructions 231 (see FIG. 2B) in the software 233 that are carried out within the computer system 120. The software instructions 231 may be formed as one or more code modules, each for performing one or more particular tasks. The software may also be divided into two separate parts, in which a first part and the corresponding code module (i.e., modules 130 and 140) acquires the 3D wave field signals from the 2D sensor array 110 and performs the 3D wave field decomposition of the spherical harmonics and a second part and the corresponding code modules manage a user interface between the first part and the user.

The software may be stored in a computer readable medium, including the storage devices described below, for example. The software is loaded into the computer system 120 from the computer readable medium, and then executed by the computer system 120. A computer readable medium having such software or computer program recorded on the computer readable medium is a computer program product. The use of the computer program product in the computer system 120 preferably effects an advantageous apparatus for generating 3D wave field decomposition of the spherical harmonics from 3D wave field signals acquired by the 2D sensor array 110.

The software 233 is typically stored in the HDD 210 or the memory 206. The software is loaded into the computer system 120 from a computer readable medium, and executed by the computer system 120. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 120 preferably effects an apparatus for generating 3D wave field decomposition of the spherical harmonics from 3D wave field signals acquired by the 2D sensor array 110.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 120 from other computer readable media. Computer readable storage media refers to any non-transitory tangible storage medium that provides recorded instructions and/or data to the computer system 120 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 120 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 120 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 120 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which are used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements use input variables 254, which are stored in the memory 234 in corresponding memory locations 255, 256, 257. The disclosed arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIG. 5 is associated with one or more segments of the program 233 and is performed by the register section 244, 245, 246, the ALU 240, and the control unit 239 in the processor 205 working together to perform the fetch, decode, and execute cycles for every instruction in the instruction set for the noted segments of the program 233.

The method of acquiring 3D wave field signals from the 2D sensor array 110 and generating 3D wave field decomposition of the spherical harmonics based on the acquired 3D wave field signals may alternatively be implemented in dedicated hardware such as one or more integrated circuits performing the functions or sub functions of the method of FIG. 5. Such dedicated hardware may include a field-programmable gate array, graphic processors, digital signal processors, or one or more microprocessors and associated memories.

As mentioned in paragraph [0005] above, the odd-modes 1010 of the 3D wave field spherical harmonics are undetectable when the sensor array 110 is located on the x-y plane. However, as will be discussed hereinafter, the odd-modes spherical harmonics of the 3D wave field can be acquired by sensors having directional reception pattern (i.e., first order sensor) perpendicular to the x-y plane. Thus, the 2D sensor array 110 is capable of acquiring both the even- and odd-modes spherical harmonics using a combination of omnidirectional sensors (to obtain the even-modes spherical harmonics coefficients) and first order sensors with directional reception pattern perpendicular to the x-y plane (to obtain the odd-modes spherical harmonics coefficients).

Figure 3A:
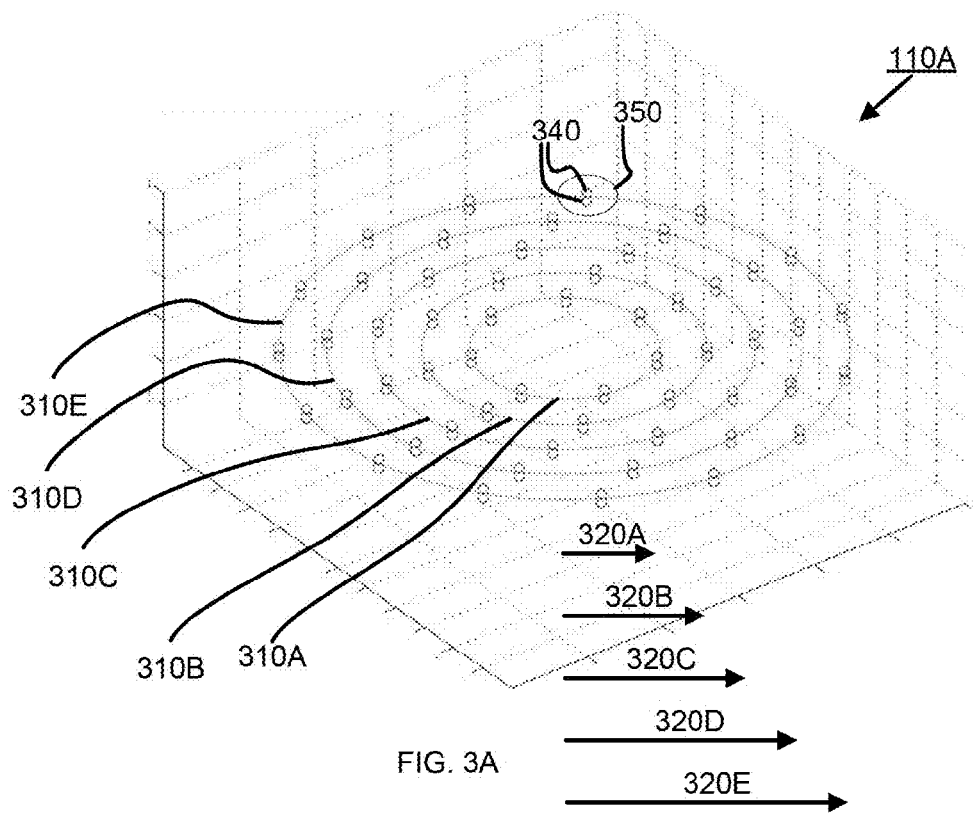
FIGS. 3A and 3B show configurations of the 2D sensor array of the system of FIG. 1.
Figure 3B:
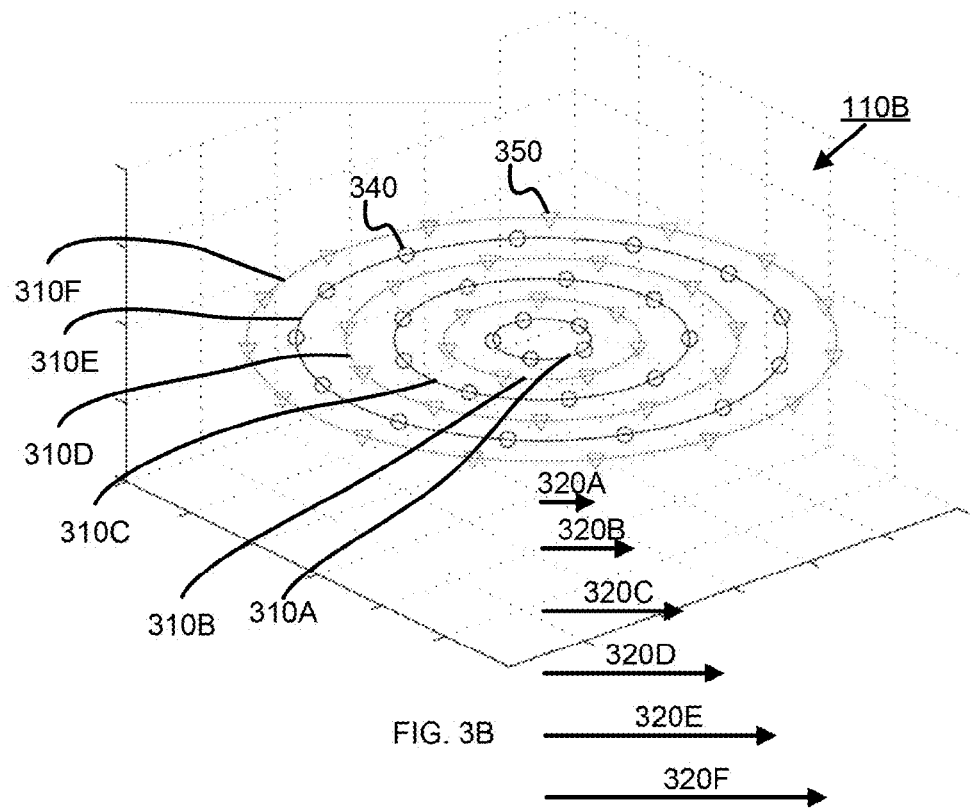

FIGS. 3A and 3B show two example configurations of the 2D sensor array 110 for detecting the 3D wave field signals. FIG. 3A shows a 2D sensor array 110A having first order sensors 350 arranged in a plurality of concentric circular arrays (310A, 310B, 310C, 310D, and 310E) with corresponding radius (320A, 320B, 320C, 320D, and 320E, respectively). The concentric circular arrays (310A, 310B, 310C, 310D, and 310E) are collectively referred to hereinafter as the circular arrays 310. However, the circular array 310N or the radius 320N is used hereinafter when referring to the largest of the circular array 310. The radius 320N is also used hereinafter to refer to the size of the 2D sensor array 110. Each concentric circular array 310 includes a number of sensors 350.

In the array 110, each of the first order sensors 350 is formed by two omnidirectional sensors 340 placed in close proximity to each other. The distance between the two omnidirectional sensors 340 in forming a first order sensor 350 is small compared to the array radius 320N. The first order (i.e., directional) sensor 350 has an opposite, bi-directional reception pattern and is oriented such that the bi-directional reception pattern is perpendicular to the plane of the array 110A. The output of the first order sensor 350 is the differential between the outputs of the omnidirectional sensors 340 forming the first order sensor 350.

One of the omnidirectional sensors 340, which is a part of the first order sensor 350, functions to receive the even-modes spherical harmonics. The first order sensor 350, using both of the omnidirectional sensors 340 that form the sensor 350, functions to receive the odd-modes spherical harmonics. The functionalities of the array 110A will be discussed further in relation to FIG. 4A.

The number of first order sensors 350 on each circular array 310 is given by equation:

$$N_X = 2N + 1 = 2\left\lceil\frac{ekR}{2}\right\rceil + 1 = 2\left\lceil\frac{e\pi R}{\lambda}\right\rceil + 1 = 2\left\lceil\frac{e\pi fR}{c}\right\rceil + 1 \quad \text{(eq. 4)}$$

where $N_X$ is the number of sensors 350 on each circular array 310, N is the maximum observable spherical harmonic order, k is the wave number of the design frequency, R is the radius 320 of the circular array 310, and c is the speed of the wave. For audio applications, c=340 m/s; for RF applications, c=300,000,000 m/s. For example, a circular array 310 of 0.2 m radius that is designed to receive 900 MHz RF signal would have 13 sensors (e.g., antennas). In another example, a circular array 310 of 0.4 m radius that is designed to receive audio signals up to 1500 Hz would have 33 sensors (e.g., microphones).

FIG. 3B shows an array 110B having omnidirectional sensors 340 and first order sensors 350 arranged in a plurality of concentric circular arrays (310A, 310B, 310C, 310D, 310E, and 310F) with corresponding radius (320A, 320B, 320C, 320D, 320E, and 320F, respectively). Each concentric circular array 310 has either the omnidirectional sensors 340 or the first order sensors 350. The array 1100B is arranged such that a concentric circular array (i.e., 310A, 310C, and 310E) with omnidirectional sensors 340 is alternated with a concentric circular array (e.g., 310B, 310D, and 310F) with first order sensors 350. The concentric circular arrays (310A, 310B, 310C, 310D, 310E, and 310F) are collectively referred to hereinafter as the circular arrays 310, similar to the circular arrays 310 of the array 110A.

In the array 110B, cardioid sensors form the first order sensors 350. Thus, the omnidirectional sensors 340 function to receive the even-modes spherical harmonics, whilst the first order sensors 350 function to receive the odd-modes spherical harmonics. The functionalities of the array 110B will be discussed further in relation to FIG. 4B. However, the first order sensor 350 may also be formed by two omnidirectional sensors 340, as implemented in the array 11A of FIG. 3A.

Figure 3C:
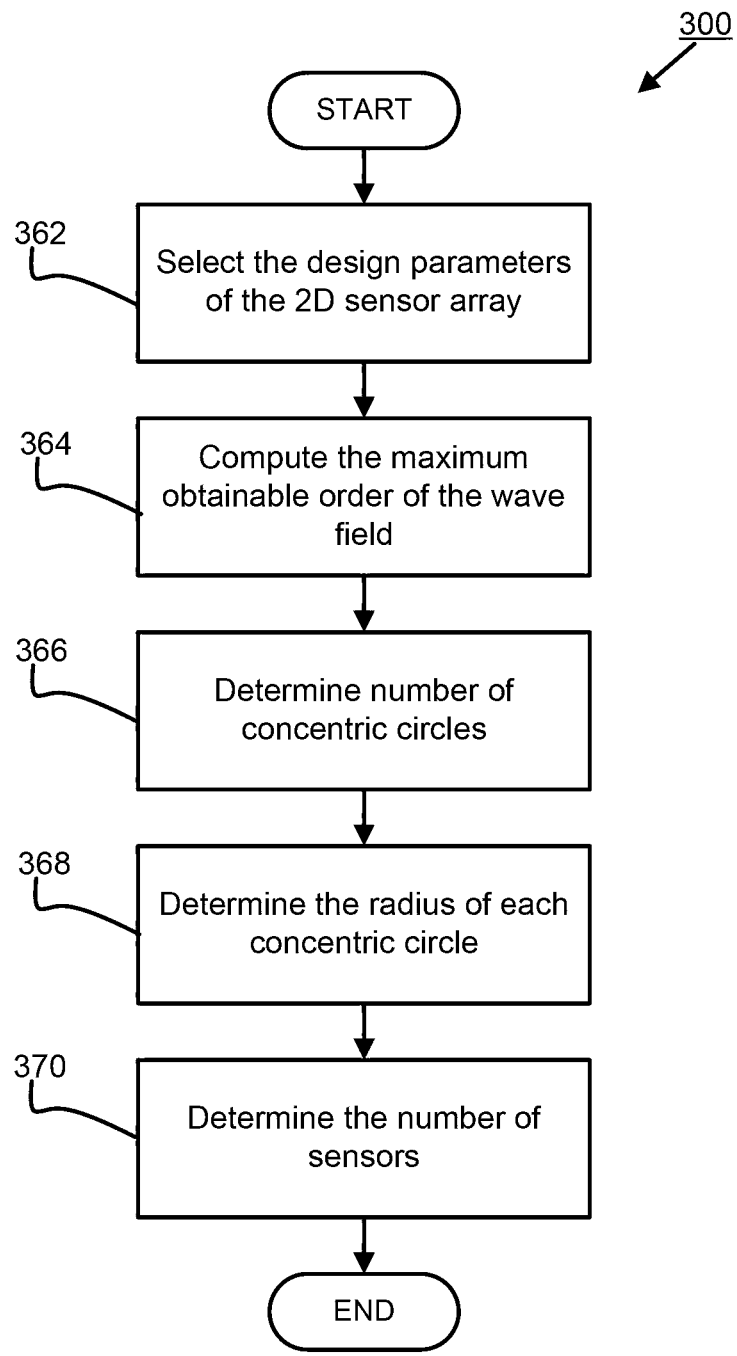
FIG. 3C is a flow diagram of a method for designing the 2D sensor array.

FIG. 3C shows a flowchart of a method 300 for designing the 2D sensor array 110. The method 300 commences at step 362 where the design parameters of the 2D sensor array 110 are selected. The design parameters include the maximum radius 320N, the highest wave number k to be acquired, and the type of first order sensors 350 to be used. For example, to design a 2D sensor array 110 for active noise cancellation in a room of dimensions 3 m×3 m, the designer may select the maximum radius 320N to be 1.5 m so that the array 110 fits on the ceiling of the room. The highest wave number k is selected depending on the highest frequency to be acquired. A highest frequency of 850 Hz results in $$k = k = \frac{2\pi f}{c} = 15.7,$$

where c=340 m/s for an audio application, for example. The method 300 then proceeds to step 364.

In step 364, the maximum obtainable order of the wave field is computed. The maximum obtainable order of the wave field N is obtainable by using equation $$N = \left\lceil\frac{ekr}{2}\right\rceil.$$

The method 300 continues to step 366.

In step 366, the number of concentric circular arrays 310 is determined. Based on the maximum number of wave field order N, as computed in step 364, the number of circular arrays 310 can be chosen. For the 2D sensor array 110A, the total number of circular arrays 310 for the first order sensors 350 is at least $N_{first}=\lceil N/2\rceil$. For the 2D sensor array 110B, the total number of circular arrays 310 for the omnidirectional sensors 340 is $N_{omni}=\lceil N/2\rceil$, and the total number of circular arrays 310 for the first order sensors 350 is $N_{first}=N-N_{omni}$. The method 300 then proceeds to step 368.

In step 368, the radius 320 for each concentric circular array 310 is determined. The radius 320 for each circular array 310 is chosen such that the circular arrays 310 are distributed so that the spherical Bessel zeros at the target frequency band are avoided. The spherical Bessel functions (shown in eq. 10 hereinafter) are used to determine the radius 320 of each circular array 310. For a given frequency k, the spherical Bessel function $j_n(kr)$ becomes zero at certain radius 320. If a circular array 310 is placed at the radius 320 where the spherical Bessel function is zero, then the product of the spherical Bessel function (i.e., $C_{nm}j_n(kr)$ $P_{nm}(\cos\theta)E_m(\varphi)$) becomes zero, due to the "Bessel zero", which makes calculation of $C_{nm}$ very difficult. Therefore, radius 320 where the "Bessel zeros" would occur should be avoided when designing the circular arrays 310. The method 300 then proceeds to step 370.

In step 370, the number of sensors (340 and 350) is determined. The number of sensors (340 and 350) on each circular array 310 is given by equation 4 above. The method 300 concludes after step 370.

Figure 4A:
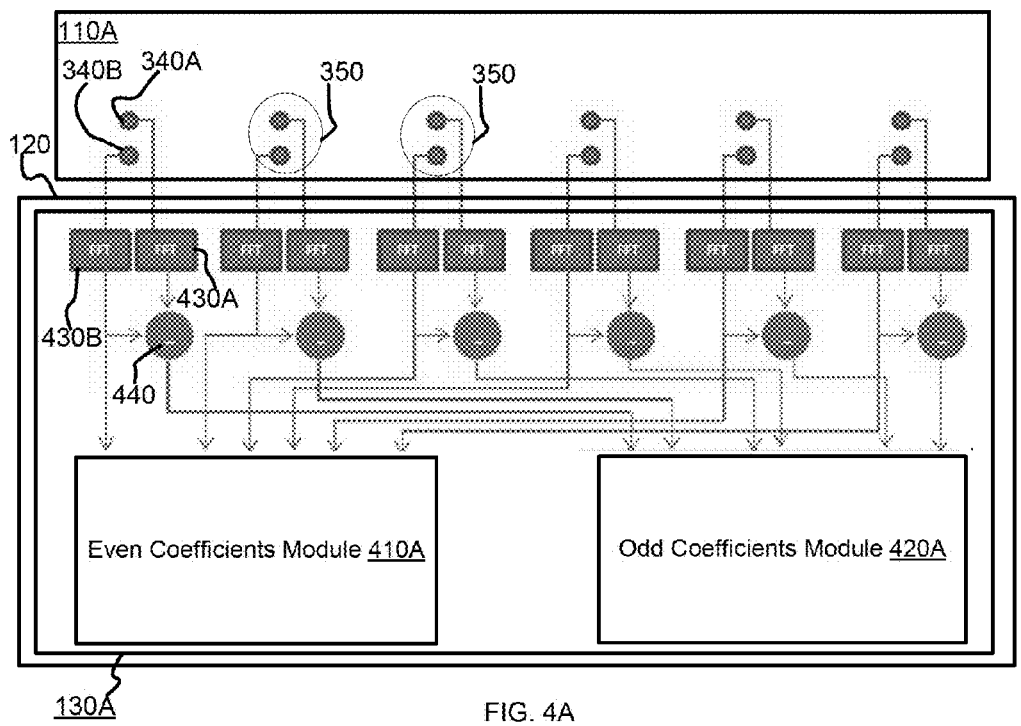
FIGS. 4A and 4B show block diagrams of implementations of the system of FIG. 1.

FIG. 4A shows the implementation of the array 110A on the system 100. As discussed in relation to FIG. 3A above, the first order sensor 350 of the array 110A is formed by two omnidirectional sensors (340A and 340B). The output of each of the omnidirectional sensors 340 is transmitted to the computer system 120 which is then processed by the array processing module 130A, as the array processing module 130A is executed by the processor 205.

The array processing module 130A has fast Fourier transform (FFT) modules (430A, 430B), differential modules 440, even coefficients module 410A, and odd coefficients module 420A. The FFT modules 430A and 430B are collectively referred to hereinafter as the FFT modules 430. The FFT modules 430 digitize the 3D wave signals acquired by the omnidirectional sensor 340. The even coefficients module 410A processes the digitized 3D wave field signals, acquired by an omnidirectional sensor 340B, to calculate the even-mode spherical harmonic coefficients of the acquired 3D wave field signals. The odd coefficients module 420A processes the digitized 3D wave field signals, acquired by the first order sensors 350, to calculate the odd-mode spherical harmonic coefficients of the acquired 3D wave field signals.

To determine the even-modes spherical harmonics coefficients, the output of the omnidirectional sensor 340B is transmitted to the FFT module 430B and the output of the FFT module 430B is transmitted to the even coefficients module 410A. The even coefficients module 410A then obtains the even-modes coefficients by using equation:

$$\begin{bmatrix} C_{mm} \\ C_{(m+2)m} \\ \vdots \\ C_{Nm} \end{bmatrix} = \begin{bmatrix} U_{mm1} & U_{(m+2)m1} & \cdots & U_{Nm1} \\ U_{mm2} & U_{(m+2)m2} & \cdots & U_{Nm2} \\ \vdots & \vdots & \ddots & \vdots \\ U_{mmX} & U_{(m+2)mX} & \cdots & U_{NmX} \end{bmatrix}^{-1} \begin{bmatrix} \alpha_{m1} \\ \alpha_{m2} \\ \vdots \\ \alpha_{mX} \end{bmatrix}, \quad (eq.\ 5)$$

where $$\alpha_{mX} = \frac{1}{N_x} \sum P(r, \theta, \varphi, k) E_m(-\varphi)$$

is the integral of mth order harmonics present on the Xth circular array 310. $P(r, \theta, \varphi, k)$ are the outputs from the FFT modules 430B. For example, the outputs from the FFT modules 430B are measured sound pressure at frequency k from each microphone unit 340B. Equation 5 is the inverse matrix of even-mode spherical harmonic coefficient, which is shown below in equation 23. For calculating the even-modes coefficients, m is an even number, and $U_{mmX} = j_n(kr_X) P_{nm}(\cos\theta)$ (eq. 6).

To determine the odd-modes spherical harmonics coefficients, the output of the omnidirectional sensor 340A is digitized by the FFT module 430A. The differential module 440 then computes the differential between the digitized outputs of the omnidirectional sensors 340A and 340B to obtain the output of the first order sensor 350, as discussed in relation to FIG. 3A above. The output of the differential module 440 is transmitted to the odd coefficients module 420A.

The odd coefficients module 420A then obtains the odd-modes coefficients by multiplying the input signal from the differential modules 440 with the inverse matrix of odd-modes spherical harmonic coefficients, which is shown below in equation 23.

Similar to obtaining the even-modes coefficients, the odd-modes coefficients are obtained using equation 5 hereinbefore, but $P(r, \theta, \varphi, k)$ are the outputs from the differential modules 440. For calculating the odd-modes coefficients, m is an odd integer, and $$U_{mmX} = -\frac{\sin(\theta_x)}{ikr_x} j_n(kr_X) P'_{nm}(\cos\theta). \quad (eq.\ 7)$$

Alternatively, the modules 410A and 420A may be implemented as a single module that receives input from the FFT modules 430B and the differential modules 440. The merged matrix solution is:

$$\begin{bmatrix} C_{mm} \\ C_{(m+1)m} \\ \vdots \\ C_{Nm} \end{bmatrix} = \begin{bmatrix} U_{mm1} & U_{(m+1)m1} & \cdots & U_{Nm1} \\ U_{mm2} & U_{(m+1)m2} & \cdots & U_{Nm2} \\ \vdots & \vdots & \ddots & \vdots \\ U_{mmX} & U_{(m+1)mX} & \cdots & U_{NmX} \end{bmatrix}^{-1} \begin{bmatrix} \alpha_{m1} \\ \alpha_{m2} \\ \vdots \\ \alpha_{mX} \end{bmatrix} \quad (eq.\ 8)$$

As the 2D array 110A has circular arrays 310 with omnidirectional sensors 340, equation 6 is used to calculate the $U_{mmX}$.

Equation 8 is similar to equation 5, but the dimensions of the matrices of equation 8 are larger as the circular arrays 310 used here is the sum of both the omnidirectional and differential sensors 340B and 350.

Figure 4B:
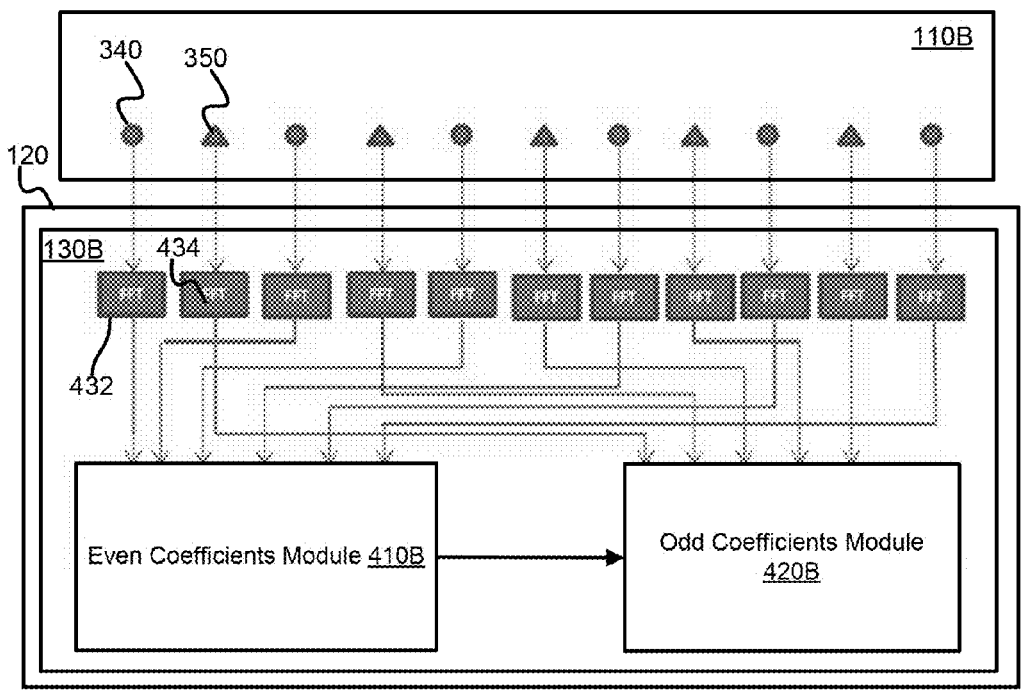

FIG. 4B shows the implementation of the array 110B on the system 100. The output of each of the omnidirectional sensors 340 and the first order sensors 350 is transmitted to the computer system 120 which is then processed by the array processing module 130B, as the array processing module 130B is executed by the processor 205.

The array processing module 130B includes FFT modules 432 and 434, even coefficients module 410B, and odd coefficients module 420B. The FFT modules 432 and 434 digitize the 3D wave signals acquired by the omnidirectional sensors 340 and the first order sensors 350, respectively. The even coefficients module 410B processes the digitized 3D wave field signals, acquired by the omnidirectional sensors 340, to calculate the even-mode spherical harmonic coefficients of the acquired 3D wave field signals. The odd coefficients module 420B processes the digitized 3D wave field signals, acquired by the first order sensors 350, to calculate the odd-mode spherical harmonic coefficients of the acquired 3D wave field signals.

To determine the even-modes spherical harmonics coefficients, the outputs of the omnidirectional sensors 340 are transmitted to the FFT modules 432 and the outputs of the FFT modules 432 are transmitted to the even coefficients module 410B. The even coefficients module 410B then obtains the even-modes coefficients by using equation 5 hereinbefore, but $P(r, \theta, \varphi, k)$ are the outputs from the FFT modules 432 and 434, m is an even number, and equation 6 is used to calculate the $U_{mmX}$.

To determine the odd-modes spherical harmonics coefficients, the outputs of the first order sensors 350 are digitized by the FFT modules 434 and transmitted to the odd coefficients module 420B.

The odd coefficients module 420B then obtains the odd-modes coefficients by using the equation: $\alpha_{diff} = \alpha_{card} - U_{even} C_{even}$, where $\alpha_{diff}$ is the $\alpha_{vector}$ of equation 5 for the differential sensor 350, $\alpha_{card}$ is the $\alpha$ vector of equation 5 for the cardioid sensor 350, $U_{even}$ is calculated using equation 6, and $C_{even}$ is the even-modes coefficients obtained by the even coefficients module 410B.

The odd-modes coefficients are then calculated using equation 5, where $C_{odd} = [U_{odd}]^{-1} \alpha_{diff}$, where $U_{odd}$ obtained using equation 7, and $\alpha_{diff}$ is as defined in the previous paragraph.

Alternatively, the even coefficients module 410B and the odd coefficients module 420B may be implemented as a single module, so that the operation can be performed using one matrix operation. The merged matrix solution is the same as equation 8, but $U_{mmx}$ for this case is $$U_{mmX} = j_n(kr_X)\left[\beta P_{nm}(\cos\theta) - (1-\alpha) - \frac{\sin(\theta_x)}{ikr_x}P'_{nm}(\cos\theta)\right].$$

β is a scaling factor, which is decided by the receiving pattern of the cardioid microphone 350.

Figure 4C:
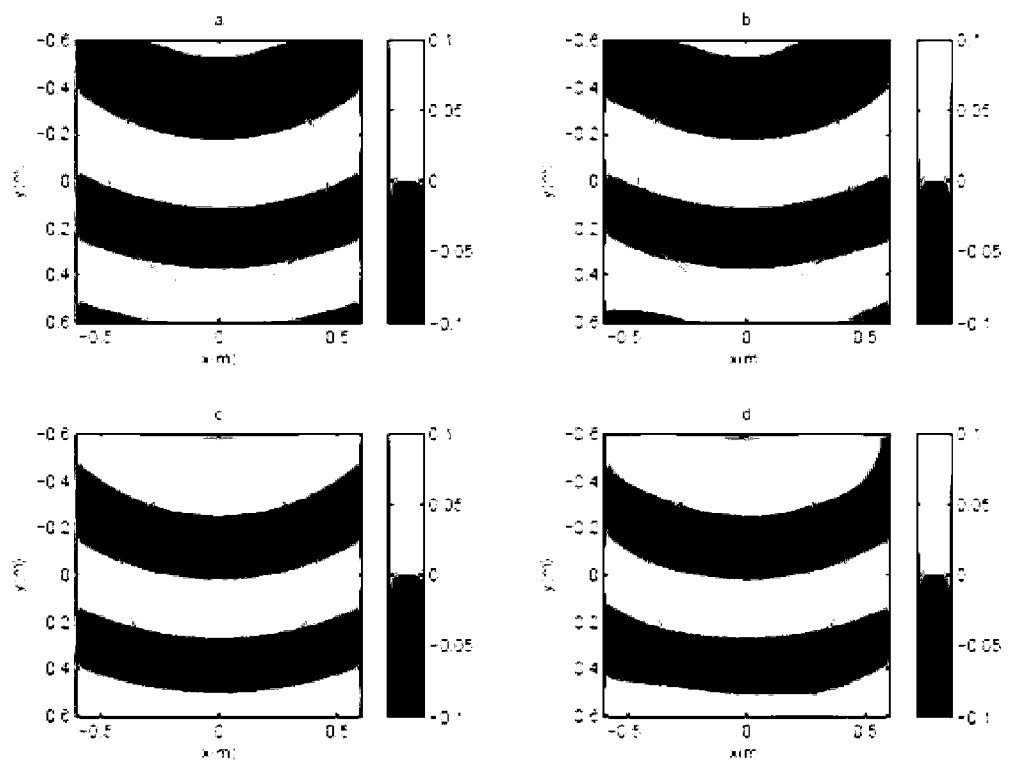
FIG. 4C shows plots (a) and (c) of sound field captured and plots (b) and (d) of reconstructed sound field by the system of FIG. 1A.

The inverse matrix used by the modules 410A, 410B, 420A, and 420B is dependent on the position of the sensors 340, 350. Thus, the inverse matrix is fixed for a specific configuration of 2D sensor array 110. A plot of a reconstructed sound field and an actual sound field can be found in FIG. 4C. Plots (a) and (c) of FIG. 4C are the actual sound field captured by the system of FIG. 1A (using the 2D sensor array 110A) at z=0 m and z=0.2 m plane respectively, whilst plots (b) and (d) are the reconstructed wave field at these two planes respectively.

FIG. 5 shows a method 500 for the system 100 to acquire 3D wave signals and construct a 3D wave field representation of the acquired 3D wave signals. The method 500 commences with step 510 to acquire 3D wave field signals using a 2D sensor array 110. The 2D sensor array 110 can be either one of the example arrays 110A and 110B. The method 500 then proceeds to step 520.

In step 520, the acquired 3D wave field signals are digitized. The acquired 3D wave field signals are digitized by FFT modules 430 or 432 and 434, depending on the configuration of the array 110 and as described above in relation to FIGS. 4A and 4B. The method 500 then proceeds to step 530.

In step 530, even coefficients of the spherical harmonics are computed. The digitized, acquired 3D wave field signals are transmitted to the even coefficients module 410A or 410B. The transmission of the digitized 3D wave field signals to the even coefficients module 410A or 410B is as described in relation to FIGS. 4A and 4B above. The method 500 proceeds to step 540.

In step 540, odd coefficients of the spherical harmonics are computed. The digitized, acquired 3D wave field signals are transmitted to the odd coefficients module 420A or 420B. The transmission of the digitized 3D wave field signals to the odd coefficients module 420A or 420B is as described in relation to FIGS. 4A and 4B above. The method 500 proceeds to step 550.

In step 550, a 3D wave field representation is constructed. The construction of the 3D wave field representation (as defined in equation 1) occurs by using the computed even and odd coefficients. The method 500 concludes after step 550.

Figure 6A:
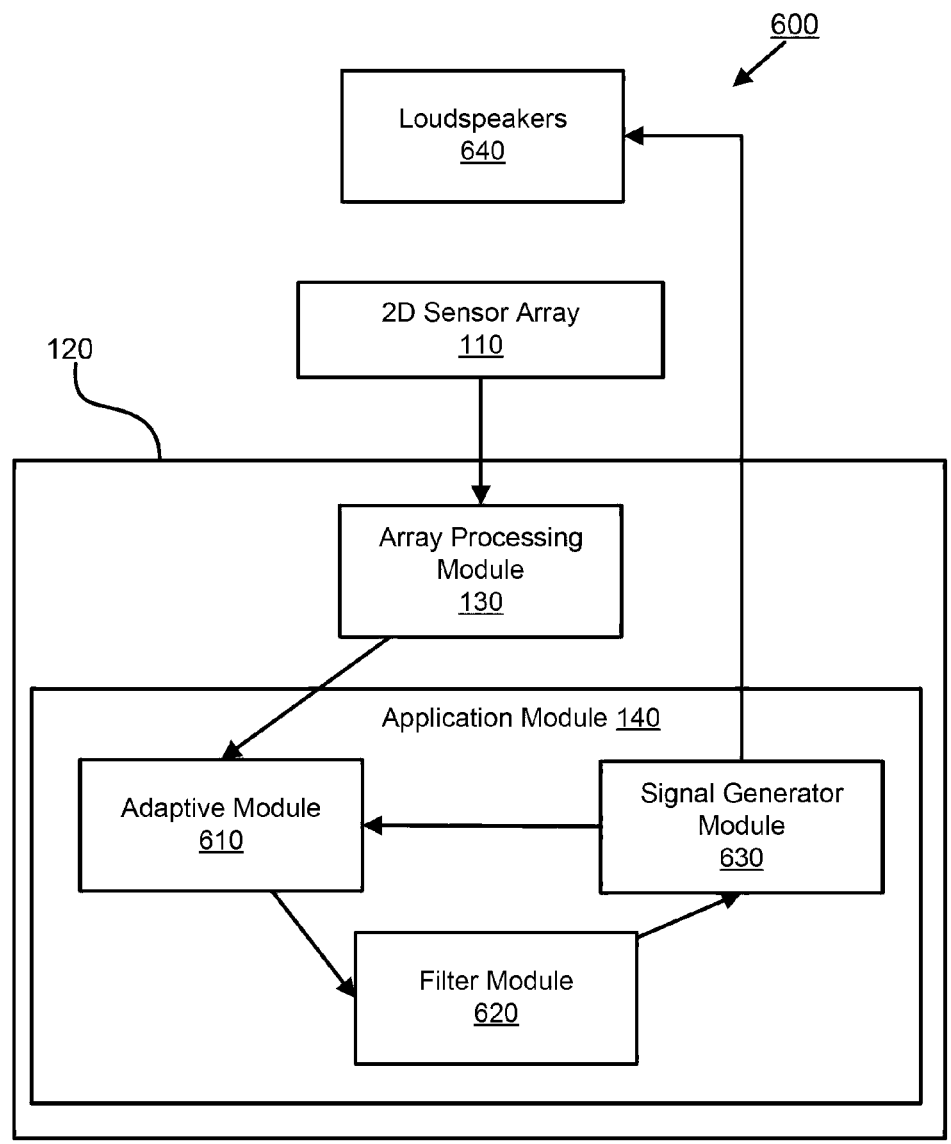
FIG. 6A is a block diagram of the system of FIG. 1 being implemented in an active noise cancellation application according to the present disclosure.

FIG. 6A shows an active noise cancellation system 600 having a 2D sensor array 110, a computer system 120 with an array processing module 130 and an application module 140, and loudspeakers 640. The 2D sensor array 110 and the array processing module 130 are as described above in relation to FIGS. 3A, 3B, 4A, and 4B. The computer system 120 is as described above in relation to FIGS. 2A and 2B.

The application module 140 includes an adaptive module 610, a filter module 620, and a signal generator module 630. The adaptive module 610 receives the 3D wave field spherical harmonic coefficients (i.e., both even- and odd-modes coefficients) from the array processing module 130. The adaptive module 610 then calculates a series of weights corresponding to the noise received by array 110 and transmits the series of weights to the filter module 620.

The filter module 620 receives the series of weights and adjusts filter coefficients of the filter module 620. The filter coefficients are then transmitted to the signal generator module 630.

The signal generator module 630 includes a reference signal matrix that has been formed by multiplying the 3D wave field spherical harmonic coefficients and channel (i.e., positional) information of loudspeakers 640. The signal generator module 630 then multiplies the received filter coefficients and the channel information to generate a series of discrete loudspeaker driving signals for the loudspeakers 640. The discrete loudspeaker driving signals are complex numbers having magnitude and phase of a sinusoidal wave. The time-domain loudspeaker driving signals are then generated by synthesizing the discrete loudspeaker driving signals and sent to the loudspeakers 640.

The loudspeakers' channel information may be calculated based on theoretical models, or measured during an offline calibration process. The loudspeakers 640 play the driving signals generated by the signal generator module 630, and produce a sound field which is the phase inversed version of the noise field, thus cancelling the noise and creating a quiet zone. Such an active noise cancellation application can be used as noise control within a cabin of vehicles (cars, airplanes), industrial noise reduction (factories), etc.

Conventional active noise cancelling techniques do not take into account of the spatial sound information, therefore the performance of these systems are largely situational and limited. However, if carried out in the wave domain (using sound field coefficients), the noise cancellation algorithm can achieve a much greater resolution, both in frequency domain and in spatial domain.

For example, the active noise cancellation can be used in a car. For this application, the microphone array 110 must be small enough to fit into the ceiling of a car cabin, yet sufficiently large to provide good resolution at all the target frequency bands. Since the majority of the ambient noise power (e.g., road noise, wind noise and engine noise) lies within the range of 50-850 Hz, the microphone array 110 is designed to operate within this frequency band.

Active noise cancellation requires high precision, but a small amount of error could lead to significant drop in the performance of the system 600. Therefore, the primary design goal for this application is to maximize the precision of the system 600, while keeping the number of microphones low.

For this application, the array 110A is better because omnidirectional microphones 340 have a smaller profile compared to a cardioid microphone. The omnidirectional microphones 340 can also be mounted close together without causing too much distortion to the acquired sound field signals. Furthermore, the separate calculation of the even- and odd-modes coefficients of the array 110A minimizes the interference between microphones 340 on different circular arrays 310, resulting in better precision.

The interior space of a car is often limited and irregular, which does not allow mounting of a spherical array inside the car. However, with the 2D sensor array 110, it is possible to integrate the planar array 110 to the ceiling of the car. With a maximum array radius 320N of 0.46 meter, the array 110 can approximately cover the region where the passengers' heads should be, while keeping the silhouette of the array 110 relatively small. For a maximum frequency of 850 Hz and a radius 320N of 0.46 m, the array 110 can receive sound field harmonics up to order $$N = \left\lceil \frac{ekr}{2} \right\rceil = 10 \qquad (eq.\ 9)$$

which means that at least 2N+1=27 microphone pairs (350) should be placed on the outermost circular array 310E. The circular arrays 310 are placed non-uniformly with more circular arrays 310 being closer to the outer circular array 310E, to maximize the detection accuracy of higher order harmonics. For this example, the radius 320 are set to 0.46 m, 0.38 m, 0.30 m and 0.20 m. The amount of microphones 350 on each circular array 310A, 310B, 310C, 310D, 310E is determined to be 21, 19, 15 and 11, respectively.

The performance of the array 110 for active noise cancellation is evaluated using simulations. The simulations test the response of the array 110 against a single point source of frequency 150-1150 Hz impinging from 1.6 meters away from the centre of the array at θ=π/4. The derived sound field coefficients are used to reconstruct the 3D wave field by comparing the reconstructed 3D wave field and the original sound field.

Figure 6B:
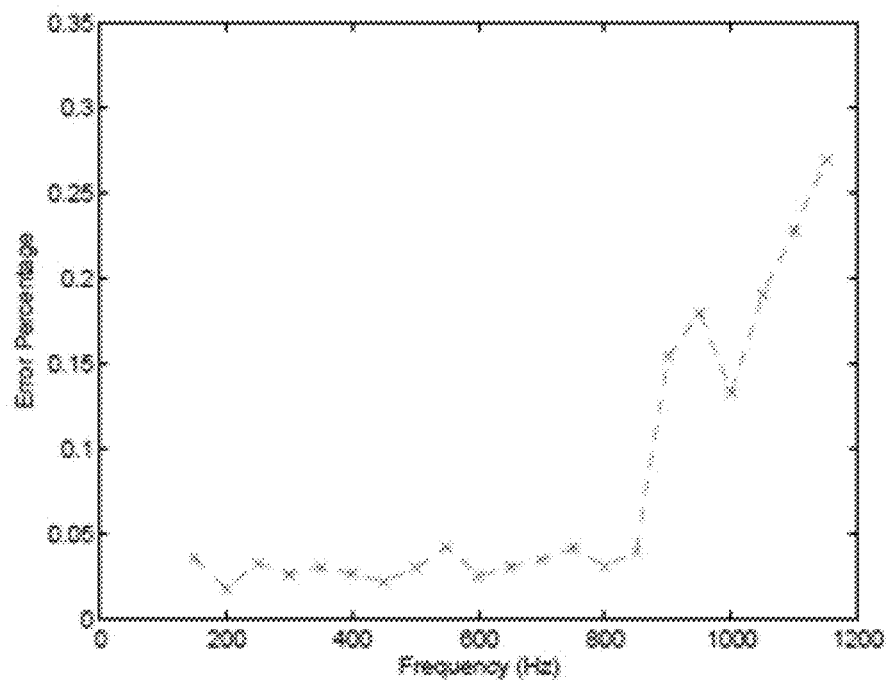
FIG. 6B is an error plot of the active noise cancellation system of FIG. 6A.
Figure 6B:
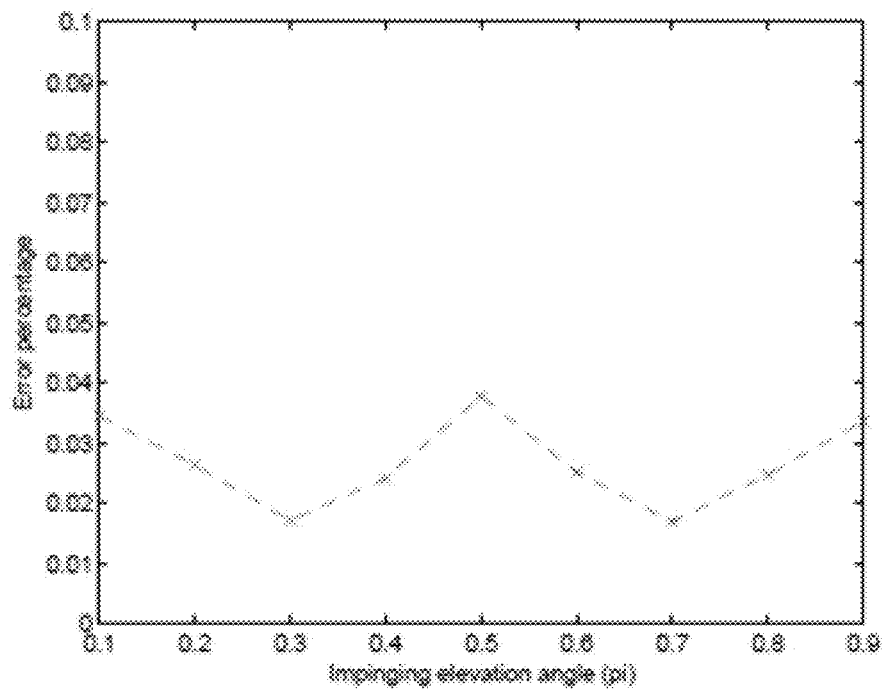

FIG. 6B shows the performance of the system 600 for different frequencies and impinging angles. It can be seen from FIG. 6B that error is relatively small below 850 Hz, which is the design maximum frequency of the array 110. Beyond 850 Hz, the error increases rapidly as the order of spherical harmonics increases beyond the design frequency of the array 110, as determined by the method 300.

According to FIG. 6B, the reproduction accuracy does not change significantly with the impinging angle of the plane wave. At 850 Hz, the array 110 is able to capture waves impinging from any direction with less than 4% of error.

Figure 7:
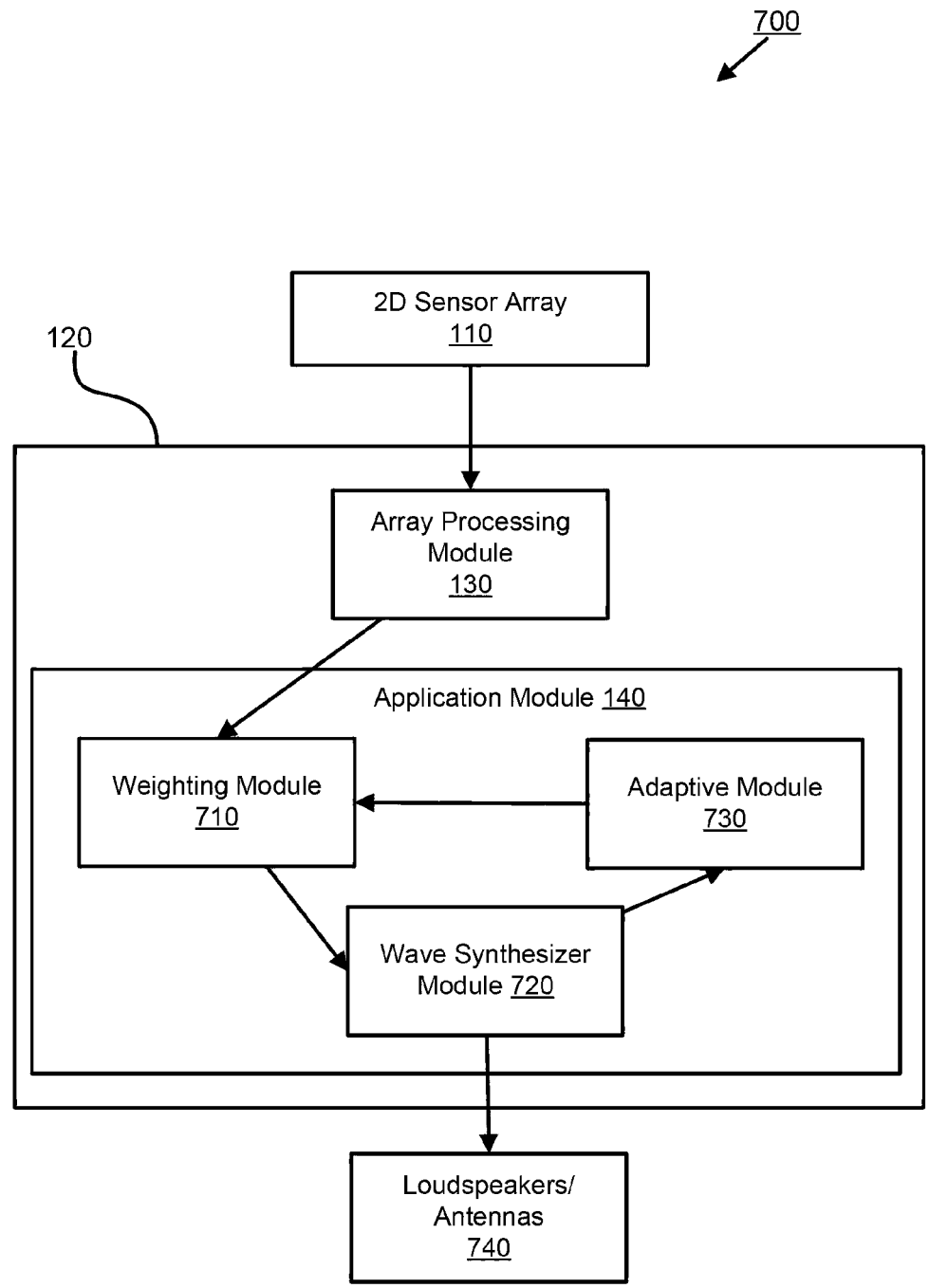
FIG. 7 is a block diagram of the system of FIG. 1 being implemented in a beamforming application according to the present disclosure.

FIG. 7 shows a beamforming system 700 having a 2D sensor array 110, a computer system 120 with an array processing module 130 and an application module 140, and loudspeakers/antennas 740. The 2D sensor array 110 and the array processing module 130 are as described above in relation to FIGS. 3A, 3B, 4A, and 4B. The computer system 120 is as described above in relation to FIGS. 2A and 2B.

The application module 140 includes a weighting module 710, a wave synthesizer module 720, and an adaptive module 730. The weighting module 710 receives the 3D wave field coefficients from the array processing module 130 and multiplies each of the received coefficients with a weighting factor. The weighted coefficients are then transmitted to the wave synthesizer module 720, which uses the weighted coefficients to synthesize a new time domain signal. The synthesized time domain signal is the output of the beamformer.

The adaptive module 730 optimizes the directivity of the system 700. The adaptive module 730 receives the beamforming output of the wave synthesizer module 720 and compares the beamforming output with a target beamforming direction. The adaptive module 730 then updates the weighting factors depending on the comparison and transmits the updated weighting factors to the weighting module 710. Typical applications of the beamforming system 700 are RF antenna arrays, directional audio recording (such as for conference recording), etc.

Figure 8:
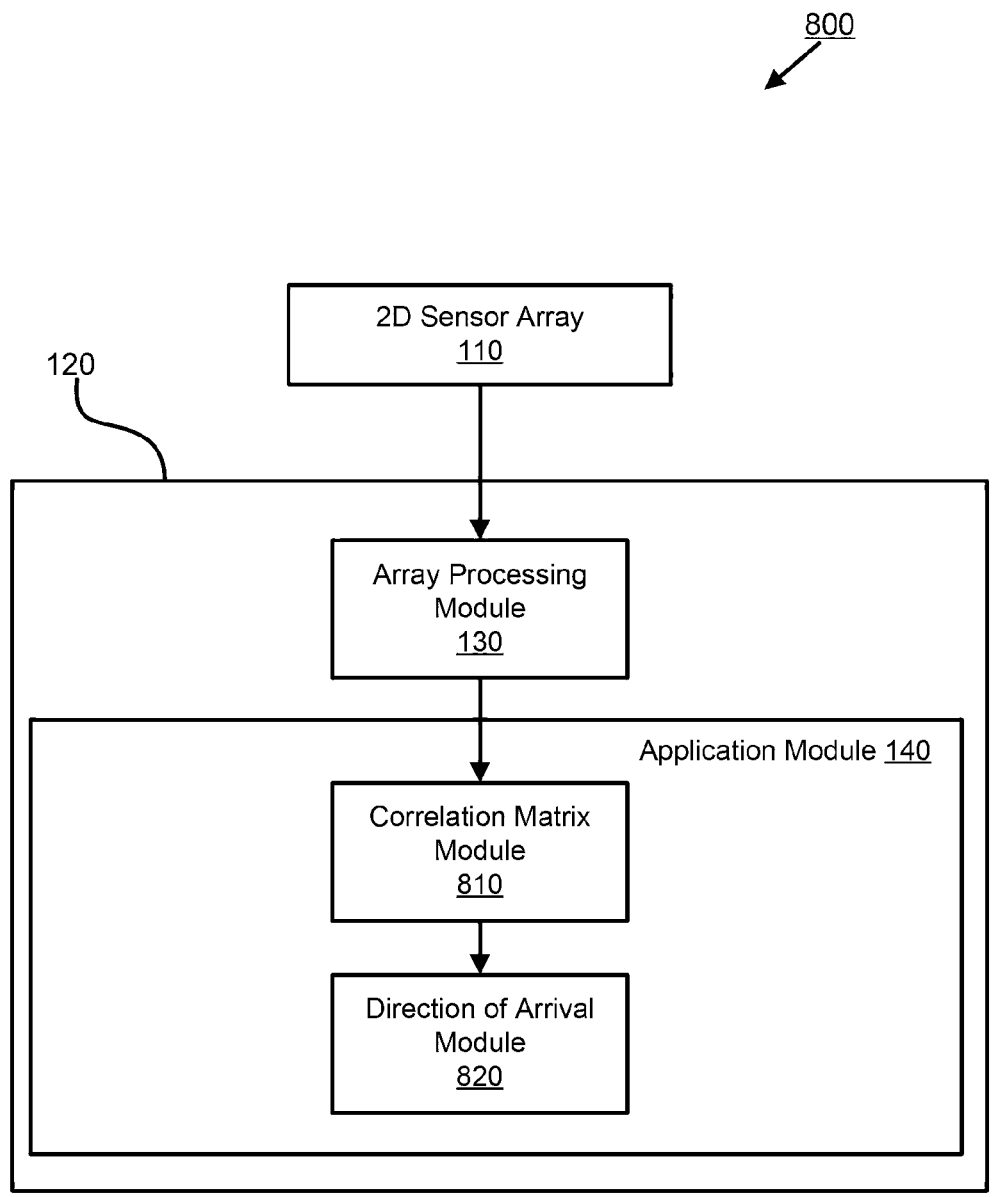
FIG. 8 is a block diagram of the system of FIG. 1 being implemented in a direction of arrival estimation application according to the present disclosure.

FIG. 8 shows a source localization/direction of arrival estimation system 800 having a 2D sensor array 110, a computer system 120 with an array processing module 130 and an application module 140. The 2D sensor array 110 and the array processing module 130 are as described above in relation to FIGS. 3A, 3B, 4A, and 4B. The computer system 120 is as described above in relation to FIGS. 2A and 2B.

The application module 140 includes a correlation matrix module 810 and a direction of arrival module 820. The correlation matrix module 810 calculates a correlation matrix from the constructed 3D wave field representation and transmits the correlation matrix to the direction of arrival module 820. The direction of arrival module 820 includes a direction of arrival algorithm (e.g., MUSIC) which uses the correlation matrix to output a two-dimensional plot corresponding to a possible direction of an impinging wave. Applications that can use the direction of arrival system 800 are tracking, sonar/radar scanning, etc.

Figure 9:
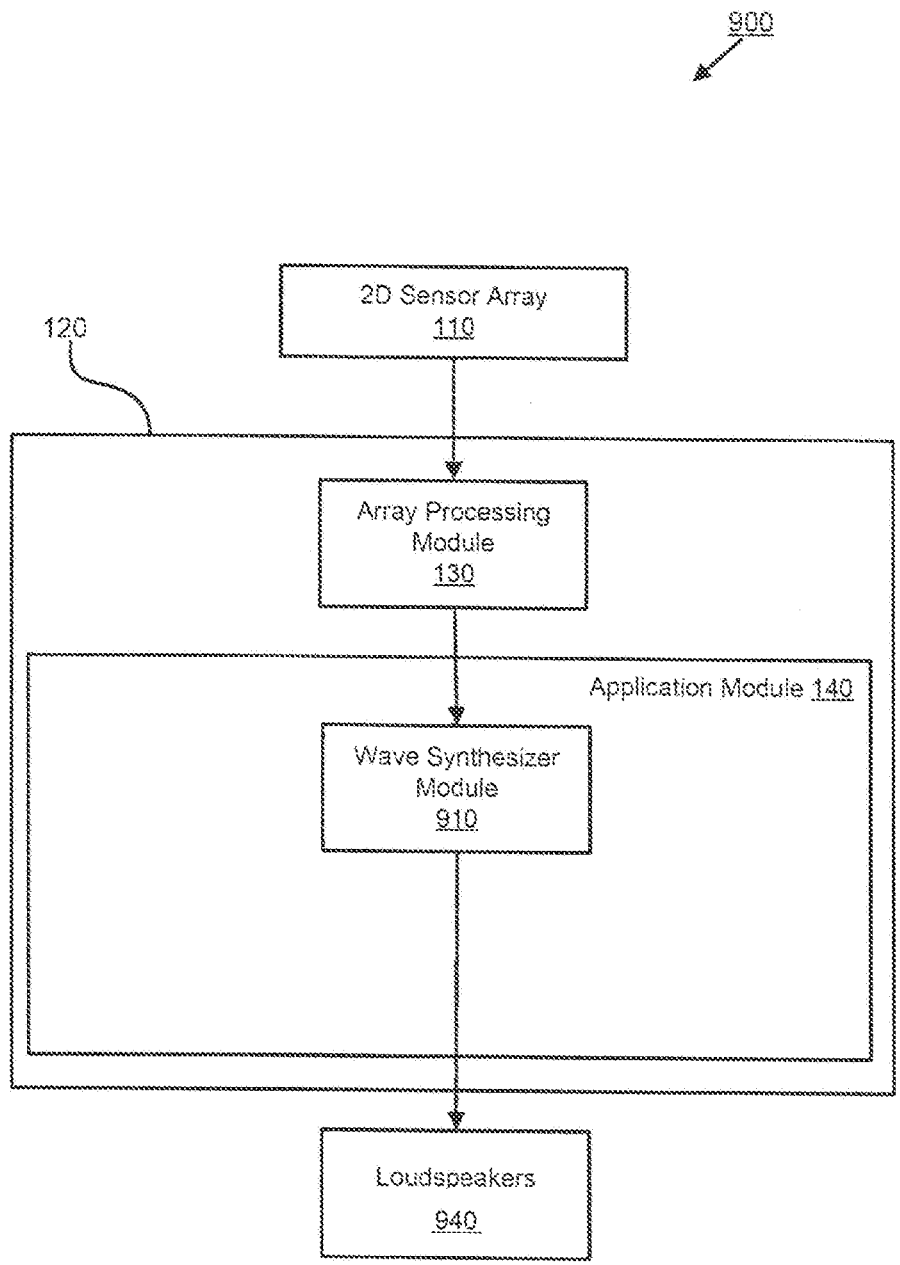
FIG. 9 is a block diagram of the system of FIG. 1 being implemented in a 3D sound field reproduction application according to the present disclosure.

FIG. 9 shows a 3D sound field recording system 900 having a 2D sensor array 110, a computer system 120 with an array processing module 130 and an application module 140, and loudspeakers 940. The 2D sensor array 110 and the array processing module 130 are as described above in relation to FIGS. 3A, 3B, 4A, and 4B. The computer system 120 is as described above in relation to FIGS. 2A and 2B.

The application module 140 includes a wave synthesizer module 910 for receiving the constructed 3D wave field representation and generating a series of loudspeakers driving signals. The wave synthesizer module 910 requires prior knowledge of the position and channel information of the loudspeakers 940 to generate the loudspeakers driving signals. The wave synthesizer module 910 then transmits the generated loudspeakers driving signals to the loudspeakers 940. However, unlike the system 600, an adaptive module is not required as the accuracy in reconstructing the acquired 3D wave field signals is not required to be as precise as the system 600.

The system 900 allows complete recording and synthesis of an acoustic scene. The system 900 can be used for applications such as teleconferencing, audio recording for performances/movies, etc.

Figure 10:
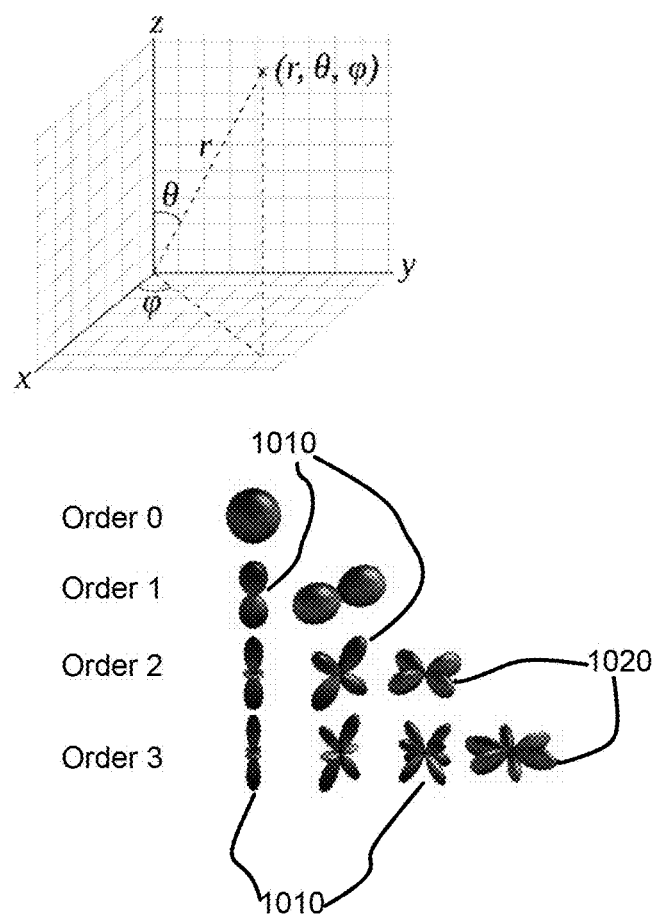
FIG. 10 shows a representation of the spherical harmonics of the third order.

Mathematical Proof of Obtaining Odd-Modes Spherical Harmonics Coefficient on the x-y Plane As mentioned in the Background section above, a 3D wave field spherical harmonics decomposition requires sensors located in 3D (i.e., xyz plane). That is, sensors placed only on the x-y plane (i.e., 2D) would not be able to provide the odd-modes 1010 of the spherical harmonics, as the odd-modes 1010 on x-y plane would be zero. However, it was observed that FIG. 10 shows that the changing rate of $P_{nm}$ with respect to θ

$$\left( i.e.,\ \frac{dP_n^m(\cos(\theta))}{d\theta} \right)$$

is identically opposite for even- and odd-modes. That is, the even-modes 1020 of $$\frac{dP_n^m(\cos(\theta))}{d\theta}$$

is equal to zero when $$\theta = \frac{\pi}{2},$$

and the odd modes 1010 are non-zero at $$\theta = \frac{\pi}{2}.$$

The observation is proven by a property of the Associated Legendre Function:

$$(x^2 - 1)\frac{dP_{nm}(x)}{dx} = nxP_{nm}(x) - (m+n)P_{n-1,m}(x) \quad \text{(eq. 10)}$$

When $$x = \cos\left(\frac{\pi}{2}\right) = 0,$$

equation 10 becomes $P'_{nm}(0) = (m+n)P_{n-1,m}(0)$. This proves the observed relationship between $$P'_{nm}\left(\cos\left(\frac{\pi}{2}\right)\right) \text{ and } P_{n-1,m}\left(\cos\left(\frac{\pi}{2}\right)\right).$$

Therefore, $P_{n-1,m}(0) = 0 = P'_{n,m}(0)$. Otherwise, both $P_{n-1,m}(0)$ and $P'_{nm}(0)$ would be non-zero. As the odd-number $$P_{n|m|}\left(\cos\left(\frac{\pi}{2}\right)\right)$$

is zero and the even-number $$P_{n|m|}\left(\cos\left(\frac{\pi}{2}\right)\right)$$

is non-zero, it can be seen that the even-number $$P'_{n|m|}\left(\cos\left(\frac{\pi}{2}\right)\right)$$

would be zero, while the odd-number $$P'_{n|m|}\left(\cos\left(\frac{\pi}{2}\right)\right)$$

is non-zero.

Therefore, although the odd-number $$P_{n|m|}\left(\cos\left(\frac{\pi}{2}\right)\right)$$

is not observable on the x-y plane, the odd-number $$P'_{n|m|}\left(\cos\left(\frac{\pi}{2}\right)\right)$$

is observable. This means that the odd-modes can be determined.

The above mathematical relations therefore prove that the odd-modes of 3D wave field spherical harmonics decomposition can be obtained on the x-y plane.

First Order Sensor for Acquiring the Odd-Mode Spherical Harmonics Coefficient on the x-y Plane In the spherical coordinate system, the particle velocity at a point $(r, \theta, \varphi)$ can be represented in the frequency domain as the gradient of equation 1:

$$V(r, \theta, \phi, k) = \frac{1}{i\varrho_0 ck}\nabla P(r, \theta, \phi, k) \quad \text{(eq. 11)}$$

For simplicity, the sensor is assumed to measure particle velocity in the θ direction. Equation 11 can then be modified to be:

$$V(r, \theta, \phi, k) = \frac{1}{i\varrho_0 ck}\frac{\partial P(r, \theta, \phi, k)}{\partial \theta} \quad \text{(eq. 12)}$$

Substituting equation 1 into equation 12 yields:

$$V(r, \theta, \phi, k) = \frac{1}{i\varrho_0 ck}\frac{\partial \sum_{n=0}^{\infty}\sum_{m=-n}^{n} C_{nm}j_n(kr)\mathcal{P}_{n|m|}E_m(\phi)}{\partial \theta} \quad \text{(eq. 13)}$$

Taking the partial derivative of $P_n^m(\cos(\theta))$ yields:

$$V(r, \theta, \phi, k) = \frac{-\sin\theta}{i\varrho_0 ck}\sum_{n=0}^{\infty}\sum_{m=-n}^{n} C_{nm}j_n(kr)\mathcal{P}'_{n|m|}(\cos\theta)E_m(\phi) \quad \text{(eq. 14)}$$

Since the coefficients, $C_{nm}$, are treated as unknown parameters in equation 14, the derived representation should be suitable to represent any types of wave field.

For a plane wave impinging from a direction $(\theta, \varphi)$, the wave field can be described as $P(r, \theta, \varphi, k) = e^{ikr(\sin\theta \sin\vartheta \cos(\varphi-\phi) + \cos\theta \cos\vartheta)}$, which when substituted into equation 12 yields:

$$V = \frac{1}{i\varrho_0 c}i(\sin\theta\sin\vartheta\cos(\phi-\varphi) + \cos\theta\cos\vartheta)P \quad \text{(eq. 15)}$$

Combining equations 14 and 15 gives the wave field captured by a first order sensor as:

$$(\cos\theta\sin\vartheta\cos(\phi-\varphi) - \sin\theta\cos\vartheta)P(r, \theta, \phi, k) = \quad \text{(eq. 16)}$$
$$-\frac{\sin\theta}{ikr}\sum_{n=0}^{\infty}\sum_{m=-n}^{n} C_{nm}j_n(kr)\mathcal{P}'_{n|m|}(\cos\theta)E_m(\phi)$$

A part of the left hand side of equation 16 (i.e., $(\cos\theta\sin\vartheta\cos(\varphi-\phi) - \sin\theta\cos\vartheta)$) is equal to the pattern of a first order sensor when normally placed to the radial direction at $\theta = \pi/2$. That is, the first order sensor is pointed at $$\left(\theta + \frac{2}{\pi}, \phi\right).$$

The remaining term on the left hand side (i.e., $P(r, \theta, \varphi, k)$) is the actual wave field at the position of the sensor. Multiplication of the two left-hand side terms gives the wave field acquired by the first order sensor.

On the right hand side of equation 16, the Associated Legendre function is replaced by the first order derivative of the function, which changes the zero points of the term. As discussed above, the odd modes of $P_n^m(x)$ are non-zero when x=0. This new representation therefore allows measurement of odd-mode wave field coefficients on the $$\theta = \frac{\pi}{2}$$

plane.

Thus, according to paragraphs [00122] and [00123] above, a first order sensor is capable of obtaining the odd mode coefficients of the spherical harmonics when the first order sensor is placed vertically (i.e., perpendicular to the x-y plane).

One example implementation of a first order sensor is two omnidirectional sensors placed in close proximity, as discussed in relation to FIG. 3A. Assuming that the two omnidirectional sensors are place in a spherical coordinate with location $M_1=(r,0, 0)$ and $M_2=(r, \pi, 0)$, the output signal is defined as $$S=S_1-S_2 \quad \text{(eq. 17)}$$

where $S_1$ and $S_2$ are signal outputs of the two omnidirectional sensors located at $M_1$ and $M_2$, respectively. For a far field source located at a position (L, θ, φ)(L>>r), the two omnidirectional sensors has a reception pattern represented as:

$$G=\cos\theta \quad \text{(eq. 18)}$$

Although the magnitudes of the lobes are symmetric, the lobe in the $$\theta > \frac{\pi}{2}$$

region has a negative gain, meaning the phase of the signal is inverted if the signal source comes from this direction. The magnitudes of the lobes are critical as the direction of the sensor pair must match with equation 16. Otherwise, the calculated wave field would be inverted.

In another example, cardioid sensors can be used as first order sensors. Typically, the cardioid pattern of cardioid sensors is realized by taking the sum of two captured signals and applying a delay to one of the captured signals. The applied delay determines the gain pattern of the cardioid sensor. For audio microphones, the delay is realized through utilizing materials that reduce the speed of sound wave.

In one example, the cardioid sensor can be implemented using two omnidirectional sensors and applying a delay to an output of one of the omnidirectional sensors. It should be noted that a cardioid sensor does not offer superiority over the two omnidirectional sensors implementation.

A cardioid pattern can also be obtained as the weighted sum of an omnidirectional pattern and a differential pattern, the gain can thus be written as:

$$G=(\beta+(1-\beta)\cos(\theta)) \quad \text{(eq. 19)}$$

where β is the weighting factor. A standard cardioid pattern is realized when β=0.5, meaning the two components have the same weight. Thus, the wave field captured by a cardioid sensor can be represented as the weighted sum of an omnidirectional sensor and a differential sensor. Combining equations 1 and 14 yields the wave field acquired by a cardioid sensor:

$$(\beta + (1-\beta)(\cos\theta\sin\vartheta\cos(\phi-\varphi)-\sin\theta\cos\vartheta))P = \quad \text{(eq. 20)}$$
$$\sum_{n=0}^{\infty}\sum_{m=-n}^{n} C_{nm}j_n(kr)\left(\beta\mathcal{P}_{n|m|} - (1-\beta)\frac{\sin\theta}{ikr}\mathcal{P}'_{n|m|}\right)E_m(\phi)$$

Similar to equation 16, the left hand side of equation 20 represent the reception pattern of a cardioid sensor multiplied by the actual wave field at the position of the sensor. The right hand side of equation 20 is the weighted combination of the wave field decomposition of the two reception patterns. For a given cardioid sensor (e.g., a unidirectional microphone), the left hand side of equation 20 is fixed. However, if the exact beam pattern is known, the weighting coefficient α can be adjusted to match the beam pattern.

Array Configuration

The total wave field at location $$\left(r, \frac{\pi}{2}, \phi\right)$$

over a circular array 310 of the array 110 can be obtained by the equation:

$$P(r, \theta, \phi, k) = \sum_{n=0}^{\infty}\sum_{m=-n}^{n} C_{nm}j_n(kr)\mathcal{P}_{n|m|}(0)E_m(\phi) \quad \text{(eq. 21)}$$

Multiplying both sides of equation 21 by $E_m(-\varphi)$ and integrating with respect to φ over [0, 2π) then yields the total wave field over one concentric circular array (e.g., 310A):

$$\int_0^{2\pi} PE_m(-\phi)d\phi = \sum_{n=|m|}^{N} C_{nm}j_n(kr)\mathcal{P}_{n|m|}(0) \quad \text{(eq. 22)}$$

The total wave field over a plurality of concentric circular arrays 310 is found through solving the matrix equation:

$$\begin{bmatrix} \alpha_{m1} \\ \alpha_{m2} \\ \vdots \\ \alpha_{mX} \end{bmatrix} = \begin{bmatrix} U_{mm1} & U_{(m+1)m1} & \cdots & U_{Nm1} \\ U_{mm2} & U_{(m+1)m2} & \cdots & U_{Nm2} \\ \vdots & \vdots & \ddots & \vdots \\ U_{mmX} & U_{(m+1)mX} & \cdots & U_{NmX} \end{bmatrix} * \begin{bmatrix} C_{mn} \\ C_{(m+1)m} \\ \vdots \\ C_{Nm} \end{bmatrix} \quad \text{(eq. 23)}$$

Where $\alpha_{mX}=\int_0^{2\pi} P(r, \theta, \varphi, k)E_m(-\varphi)d\varphi$ is the integral of mth order harmonics present on a circular array (e.g., 310A). $U_{NmX}=j_N(kr_X)P_{N|m|}(0)$ is the harmonic associated with each coefficient.

Since the term $P_{N|m|}(0)=0$ for odd-modes, only even mode coefficients can be derived from the above equation.

One example in deriving odd mode coefficients is to use first order sensors placed on a circular array (e.g., 310A) and pointed perpendicular to the $$\theta = \frac{\pi}{2}$$

plane. Equation 16 is then integrated with respect to φ over [0, 2π) to yield:

$$\int_0^{2\pi} P_\theta E_m(-\phi)d\phi = -\frac{\sin\theta}{ikr}\sum_{n=|m|}^{N} C_{nm} j_n(kr)(P')_{n|m|}(\cos\theta) \quad \text{(eq. 24)}$$

where $$P_\theta\left(r, \frac{\pi}{2}, \phi, k\right) = \left(\cos\frac{\pi}{2}\sin\vartheta\cos(\phi-\varphi) - \sin\frac{\pi}{2}\cos\vartheta\right)P\left(r, \frac{\pi}{2}, \phi, k\right)$$

is the wave field received by a first order sensor at (r, π/2, φ). The coefficients can then be calculated by solving the matrix inversion presented in equation 23, with $$U_{NmX} = -\frac{\sin(\theta_X)}{ikr_X} j_N(kr_X) P'_{N|m|}(\cos\theta_X).$$

Due to the term $P'_{n|m|}(\cos\theta)=0$ when $$\theta = \frac{\pi}{2},$$

the matrix solution only contains the odd mode coefficients if the first order sensors are placed on a circular array (e.g., 310A).

The full 3D wave field spherical harmonics decomposition can therefore be retrieved by combining the retrieved even and odd mode coefficients.

Equations 22 and 24 are for an ideal situation where the sensor is continuous over a circular array (e.g., 310A). In a real-world implementation, however, there are only a discrete number of sensors placed on a circular array (e.g., 310A). Thus, the discrete forms of equations 22 and 24 are:

$$\frac{2\pi}{N_X}\sum P(r_X, \theta_X, \phi, k) E_m(\phi) = \sum_{n=|m|}^{N} C_{nm} j_n(kr) P_{n|m|}(0) \quad \text{(eq. 25)}$$

and $$\frac{2\pi}{N_X}\sum P_\theta(r_X, \theta_X, \phi, k) E_m(\phi) = -\frac{\sin\theta}{ikr}\sum_{n=|m|}^{N} C_{nm} j_n(kr) P'_{n|m|}(\cos\theta) \quad \text{(eq. 26)}$$

Due to the spatial sampling of the acquired 3D wave field signals, sensors (340 or 350) placed on a circular array (e.g., 310A) observe a limited number of spherical harmonic orders. The relationship between the number of sensors $N_X$ and the maximum observable spherical harmonic order is given by $N_X=2N+1$. However, the nature of the spherical Bessel function means a limited number of orders is observable within a circular array (e.g., 310A). The maximum number of observable harmonic orders is given by the equation:

$$N \leq \left\lceil \frac{ekr}{2} \right\rceil \quad \text{(eq. 27)}$$

where k is the wave number. The exact amount of sensor $N_X$ to be used for each circular array (e.g., 310A) depends on the size of the circular array (e.g., 310A) as well as the wave number k of the target wave field.

As the number of spherical harmonic orders obtainable by a circular array (e.g., 310A) is limited, aliasing of higher order harmonics (which are not detected by the circular array 310A) into the lower order harmonics occurs. The aliasing creates an error which depends on the presence of undetected high order harmonics. However, equation 27 gives sufficient number of sensors in each circular array 310 to provide high precision for most applications.

If an application however does not demand a high accuracy, a lower precision can be used to design a circular array (e.g., 310A). The lower precision assumes the observable harmonic order at a radius r is $N \leq \lceil kR \rceil$, which means less sensors would be used for a circular array (e.g., 310A).

Since the quantity of sensors (340 or 350) on a circular array (e.g., 310A) is linked to the wave number k, which can be translated into the wavelength λ, the number of sensors (340 or 350) can be derived from the target frequency of the application, given by equation:

$$N_X = 2N+1 = 2\left\lceil \frac{ekR}{2}\right\rceil + 1 = 2\left\lceil \frac{e\pi R}{\lambda}\right\rceil + 1 = 2\left\lceil \frac{e\pi fR}{c}\right\rceil + 1 \quad \text{(eq. 28)}$$

where c is the speed of the wave. For audio applications, c=340 m/s; for RF applications, c=300,000,000 m/s. For example, a circular array (e.g., 310A) of 0.2 m radius, designed to receive 900 MHz RF signal would have 13 sensors; while a circular array (e.g., 310A) of 0.4 m radius, designed for audio signals up to 1500 Hz would need 33 sensors (i.e., microphones).

The total number of sensors (340 or 350) is doubled for array 110A, due to the use of two omnidirectional sensors 340 for each sensor 350. It should be noted that the distance between the two omnidirectional sensors 340 in array 110A is small compared to the array radius 320N, to approximate $P_n^m(\cos\theta)$ in equation 24.

For arrays 110A and 110B, the even- and odd-modes coefficients can be calculated together using a single pseudo-inverse operation, instead of having to process either of them individually. The calculation is done in the same manner as equation 23, with $\alpha_{mX}$ being the sum of mth mode response of a circular array (e.g., 310A). $U_{NmX}$ is the wave field expression for a circular array (e.g., 310A), and it has to exactly match with $\alpha_{mX}$ on the left hand side of the equation. In other words, $U_{NmX}$ should take one of the following expressions, based on the sensor (340 or 350) used on a circular array (e.g., 310A):

$$U_{NmX} = \begin{cases} j_N(kr_X)P_{N|m|} & \text{omnidirectional} \\ -\frac{\sin(\theta_X)}{ikr_X}j_N(kr_X)P'_{N|m|} & \text{differential} \\ j_n(kr)\left(\alpha P_{n|m|} - (1-\alpha)\frac{\sin\theta}{ikr}P'_{n|m|}\right) & \text{cardioid} \end{cases} \quad \text{(eq. 29)}$$

The 2D array's ability to detect vertical components (i.e., odd-mode coefficients) of the 3D wave field spherical harmonic decomposition is due to the combined use of zeroth (340) and first order sensors (350). A planar array of omnidirectional sensors (340) cannot distinguish between waves that come from either sides of the array 400. As a result, only the even modes of the wave field components, which are symmetric over the sensor plane, can be picked up by a planar array. The odd modes correspond to wave field components that are non-symmetric over the plane, these modes are essential to represent a wave impinging from an off-plane direction. The combined use of omnidirectional sensors and vertically placed first order sensors allow the array to distinguish between waves impinging from either sides of the array plane, which means that the non-symmetric portion of the wave field is now visible to the hybrid sensor array.

As mentioned in paragraph [0008] above, the spherical array works at a narrow frequency band. The 2D array 110 however operates on a broad frequency band, since the array 110 is distributed uniformly. Some of the circular arrays 310 would always be able to receive an active mode, at certain frequencies. However, the highest order active modes are received by the one or two largest circular arrays of radius 320N or 320N−1. Therefore the radius 320 of the circular arrays 310 need to be designed cautiously, otherwise the captured wave field coefficients may be noisy. Overall, the 2D array 110 has the capability of analysing broad band 3D wave field signals. Such a broad band capability makes the 2D array 110 suitable for acoustic applications, as acoustic waves such as human voice and engine noise have a wide frequency band, typically from 100 Hz to a few thousand Hertz.

Error Analysis

Spatial Sampling

In most sensor array configurations that are based on discrete sensors, spatial sampling is a major and fundamental cause of error. Typically, in order to avoid spatial sampling, the distance between each two sensors must be less than half of the wavelength of the target signal $$\left(\text{i.e., } d \leq \frac{\lambda}{2}\right),$$

where d is the distance between two sensors and $\lambda$ is the wavelength of the highest frequency of the signal.

For the 2D array 110 described above, however, the error due to spatial sampling is represented by the equation:

$$\Delta E = \int_0^{2\pi} P(r, \theta, \phi, k) E_m(-\phi) d\phi - \frac{2\pi}{N_X} \sum P(r_X, \theta, \phi, k) E_m(-\phi) \quad \text{(eq. 30)}$$

The spatial sampling of the array 110 limits the maximum observable spatial frequency, which is represented as the order of the spherical harmonics. The truncation error due to the limitation is represented by the equation:

$$\Delta E = \sum_{n=|m|}^{\infty} C_{nm} j_n(kr) P_{n|m|} - \sum_{n=|m|}^{N} C_{nm} j_n(kr) P_{n|m|} \quad \text{(eq. 31)}$$
$$= \sum_{n=N+1}^{\infty} C_{nm} j_n(kr) P_{n|m|}$$

The power $\Delta E$ depends on the spherical Bessel function, which value is a function of the wave number k and the radius 320 (i.e., r). For a given order of the spherical Bessel function $j_N(kr)$, if kr is sufficiently small, then the value of $j_N(kr)$ becomes close to zero. On the other hand, for a fixed kr, the active spherical harmonics is limited to N.

The maximum number of active spherical harmonics order is given by $$N = \left\lceil \frac{ekr}{2} \right\rceil.$$

The minimum amount of sensor to be used in the array is therefore 2N+1. However, the array's accuracy can be improved through the use of additional sensors in the array.

In equation 25, the wave field coefficients are calculated through solving the matrix equation $\alpha = UC$. Any aliasing error on a impacts on al the sound field coefficient $C_n^m$. The error percentage is given by:

$$E_m = \frac{\Delta E_{mX}}{\alpha_{mX}} = \frac{\sum_{n=N+1}^{\infty} C_{nm} j_n(kr) P_{n|m|}}{\sum_{n=|m|}^{\infty} C_{nm} j_n(kr) P_{n|m|}} \quad \text{(eq. 32)}$$

If a circular array (e.g., 310A) has insufficient amount of sensors (340 or 350), then all the $\alpha_{mX}$ derived from the array's output would be incorrect. Since the algorithm uses a matrix inversion operation to solve the coefficients, which follows the least mean square (LMS) fit, the errors in a single $\alpha_{mX}$ are evenly distributed to all of the calculated wave field coefficients of mode m. The error at each resulting coefficient $C_{nm}$ is given by:

$$E_{nm} = \frac{E_m}{n - m + 1} \quad \text{(eq. 33)}$$

Equation 33 indicates that individual coefficients of lower modes tend to suffer less from the aliasing error, since there are more coefficients to share the error. However, the total error power of each mode remains the same across all available modes.

The error percentage can be minimized as long as a sufficient amount of sensors are used for the spatial sampling. It should be noted that the error percentage only reflects the average expected error of calculated coefficients due to spatial aliasing. Another source of error due to insufficient sampling is that a certain amount of active high order harmonics are missed out (these harmonics caused aliasing error to the lower order coefficients), but this type of error is only visible during wave field reproduction and the individual wave field coefficients are not directly affected by this phenomenon.

As the array has multiple concentric circular arrays 310, each circular array (e.g., 310A) observes a different maximum order of spherical harmonics. For example, all the circular arrays 310 observe the zeroth order harmonic, but the highest order harmonics is observable by the largest circular array 310N of radius 320N. Thus, calculation of the lower order modes is more accurate, as the lower order modes are sampled by most (if not all) of the circular arrays 310. The higher order coefficients however are not as precisely calculated, as the highest order modes are only observed by one or two circular arrays (e.g, 310N and 310N−1) with the largest radius (e.g., 320N and 320N−1, respectively). This results in the central part of the wave field being calculated more accurately than the outer area. The reconstructed 3D wave field thus gradually loses precision at greater elevations, since only the high order harmonics contribute to these regions. In order to compensate for such an error, more circular arrays 310 with larger radius 320 be placed in the system 100, rather than using an uniformly distributed circular arrays 310.

INDUSTRIAL APPLICABILITY

The arrangements described are applicable to the signal processing field.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for constructing a three-dimensional (3D) wave field representation of a 3D wave field using a two-dimensional (2D) sensor array, said method comprising:
   acquiring 3D wave field signals using a 2D array of sensors, said 2D array of sensors comprising omnidirectional sensors and first order sensors arranged in a 2D plane;
   digitizing said acquired 3D wave field signals;
   computing even coefficients of spherical harmonics dependent upon said digitized 3D wave field signals acquired by said omnidirectional sensors;
   computing odd coefficients of said spherical harmonics dependent upon said digitized 3D wave field signals acquired by said first order sensors; and
   constructing a 3D wave field representation dependent upon said computed even and odd coefficients for said acquired 3D wave field signals.

2. The method according to claim 1, wherein the omnidirectional sensors and the first order sensors are placed on a plurality of concentric circular arrays.

3. The method according to claim 2, wherein the first order sensors comprise two omnidirectional sensors and each of outputs of the first order sensors is dependent on a differential between outputs of the two omnidirectional sensors.

4. The method according to claim 3, wherein the computing of the odd coefficients of said spherical harmonics depends on the outputs of the first order sensors, and the computing of the even coefficients of said spherical harmonics depends on the output of one of the two omnidirectional sensors.

5. The method according to claim 2, wherein the concentric circular arrays with the omnidirectional sensors are alternated with the concentric circular arrays with the first order sensors, and wherein the first order sensors include cardioid sensors.

6. The method according to claim 5, wherein the computing of the odd coefficients of said spherical harmonics depends on outputs of the first order sensors, and the computing of the even coefficients of said spherical harmonics depends on outputs of the omnidirectional sensors.

7. The method according to claim 1, wherein the constructed 3D wave field representation is used for any one of the following applications:
   active noise cancellation;
   beamforming;
   direction of arrival estimation; and
   sound recording or reproduction.

8. The method according to claim 1, wherein said acquired 3D wave field signals are any one of acoustic, radio frequency wave, and microwave.

9. An apparatus configured to construct a three-dimensional (3D) wave field representation of a 3D wave field using a two-dimensional (2D) sensor array, the apparatus comprising:
   a two-dimensional (2D) array of sensors configured to receive the 3D wave field signals, said 2D array of sensors comprising omnidirectional sensors and first order sensors arranged in a 2D plane; and
   a processor configured to:
   receive the acquired 3D wave field signals;
   digitize said acquired 3D wave field signals;
   compute even coefficients of spherical harmonics dependent upon said digitized 3D wave field signals acquired by said omnidirectional sensors;
   compute odd coefficients of said spherical harmonics dependent upon said digitized 3D wave field signals acquired by said first order sensors; and
   construct a 3D wave field representation dependent upon said computed even and odd coefficients for said acquired 3D wave field signals.

10. The apparatus according to claim 9, wherein the omnidirectional sensors and the first order sensors are placed on a plurality of concentric circular arrays.

11. The apparatus according to claim 10, wherein the first order sensors comprise two omnidirectional sensors and each of outputs of the first order sensors is dependent on a differential between outputs of the two omnidirectional sensors.

12. The apparatus according to claim 11, wherein the processor computes the odd coefficients of said spherical harmonics depending on the outputs of the first order sensors, and the processor computes the even coefficients of said spherical harmonics depending on the output of one of the two omnidirectional sensors.

13. The apparatus according to claim 10, wherein the concentric circular arrays with the omnidirectional sensors are alternated with the concentric circular arrays with the first order sensors, and wherein the first order sensors include cardioid sensors.

14. The apparatus according to claim 13, wherein the processor computes the odd coefficients of said spherical harmonics depending on outputs of the first order sensors, and the computing of the even coefficients of said spherical harmonics depending on outputs of the omnidirectional sensors.

15. The apparatus according to claim 9, wherein the constructed 3D wave field representation is used for any one of the following applications:
   active noise cancellation;
   beamforming;
   direction of arrival estimation; and
   sound recording or reproduction.

16. The apparatus according to claim 9, wherein the processor comprises a digital signal processor.

17. The apparatus according to claim 9, wherein the processor comprises a field-programmable gate array.

18. The apparatus according to claim 9, wherein said acquired 3D wave field signals are any one of acoustic, radio frequency wave, and microwave.

19. A non-transitory computer readable storage medium storing computer instructions for constructing a three-dimensional (3D) wave field representation of a 3D wave field using a two-dimensional (2D) sensor array, said instructions configured to cause a computer apparatus to perform the steps of:

acquiring 3D wave field signals using a 2D array of sensors, said 2D array of sensors comprising omnidirectional sensors and first order sensors arranged in a 2D plane;

digitizing said acquired 3D wave field signals;

computing even coefficients of spherical harmonics dependent upon said digitized 3D wave field signals acquired by said omnidirectional sensors;

computing odd coefficients of said spherical harmonics dependent upon said digitized 3D wave field signals acquired by said first order sensors; and constructing a 3D wave field representation dependent upon said computed even and odd coefficients for said acquired 3D wave field signals.

20. The non-transitory computer readable storage medium according to claim 19, wherein the constructed 3D wave field representation is used for any one of the following applications:

active noise cancellation;

beamforming;

direction of arrival estimation; and sound recording or reproduction.

21. The non-transitory computer readable storage medium according to claim 19, wherein said acquired 3D wave field signals are any one of acoustic, radio frequency wave, and microwave.

\* \* \* \* \*